United States Patent
Ramalingam et al.

(10) Patent No.: US 9,386,079 B2
(45) Date of Patent: Jul. 5, 2016

(54) METHOD AND SYSTEM OF VIRTUAL DESKTOP INFRASTRUCTURE DEPLOYMENT STUDIO

(71) Applicant: AMERICAN MEGATRENDS, INC., Norcross, GA (US)

(72) Inventors: Muthukkumaran Ramalingam, Chennai (IN); Santhosh Samuel Mathews, Chennai (IN); Varadachari Sudan Ayanam, Suwanee, GA (US); Joseprabu Inbaraj, Suwanee, GA (US); Samvinesh Christopher, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 289 days.

(21) Appl. No.: 14/300,676

(22) Filed: Jun. 10, 2014

(65) Prior Publication Data

US 2015/0358392 A1   Dec. 10, 2015

(51) Int. Cl.

| | |
|---|---|
| *G06F 9/455* | (2006.01) |
| *H04L 29/08* | (2006.01) |
| *G06F 17/30* | (2006.01) |
| *H04L 29/06* | (2006.01) |
| *H04L 12/24* | (2006.01) |

(52) U.S. Cl.
CPC ............ *H04L 67/10* (2013.01); *G06F 9/45533* (2013.01); *G06F 17/30893* (2013.01); *H04L 29/08846* (2013.01); *H04L 41/0273* (2013.01); *H04L 41/0803* (2013.01); *H04L 41/0806* (2013.01); *H04L 67/08* (2013.01); *H04L 67/125* (2013.01); *H04L 67/303* (2013.01); *H04L 67/38* (2013.01); *G06F 2009/45562* (2013.01); *H04L 41/0816* (2013.01)

(58) Field of Classification Search
CPC ..... G06F 21/52; G06F 21/53; G06F 9/45545; G06F 9/5077; G06F 9/45533; G06F 2009/45562; H04L 41/0806; H04L 41/0893; H04L 41/0803; H04L 63/0263; H04L 29/08846; H04L 67/08; H04L 67/10; H04W 4/003; H04W 8/245

See application file for complete search history.

(56) References Cited

U.S. PATENT DOCUMENTS

| | | | | |
|---|---|---|---|---|
| 2007/0101435 | A1* | 5/2007 | Konanka | G06F 21/52 726/27 |
| 2010/0024036 | A1* | 1/2010 | Morozov | G06F 21/53 726/26 |
| 2010/0138528 | A1* | 6/2010 | Frank | G06F 9/5077 709/224 |

(Continued)

*Primary Examiner* — Le H Luu
(74) *Attorney, Agent, or Firm* — Locke Lord LLP; Tim Tingkang Xia, Esq.

(57) ABSTRACT

Aspects of the present disclosure relates to a virtual desktop deployment system configured to deploy a virtual desktop infrastructure. In certain embodiments, the virtual desktop deployment system includes: (a) virtual desktop servers, for hosting the virtual desktop infrastructure, (b) a computer server for deploying virtual desktop infrastructure by a system administrator, and a deployment database for storing virtual desktop infrastructure configuration and system settings, and (c) a virtual desktop deployment entity configured to perform following operations: (a) receiving configuration and system settings of the virtual desktop infrastructure, (b) discovering and scanning the virtual desktop servers to obtain system information, (c) establishing deployment rules and deployment dependencies, (d) reading the virtual desktop infrastructure configuration and system settings, (e) deploying the virtual desktop infrastructure to the virtual desktop servers, and (f) generating and storing the status, the reports, and the logs of the virtual desktop infrastructure deployment.

30 Claims, 4 Drawing Sheets

(56) References Cited

U.S. PATENT DOCUMENTS

| | | | | |
|---|---|---|---|---|
| 2011/0107331 A1* | 5/2011 | Evans | ................... | H04W 4/003 718/1 |
| 2011/0296411 A1* | 12/2011 | Tang | ................... | G06F 9/45545 718/1 |
| 2013/0282798 A1* | 10/2013 | McCarthy | ........... | H04L 41/0806 709/203 |
| 2014/0122670 A1* | 5/2014 | Levy | ................... | H04L 41/0893 709/220 |
| 2014/0200036 A1* | 7/2014 | Egner | ................... | H04W 8/245 455/456.3 |
| 2016/0057168 A1* | 2/2016 | Reddock | ............. | H04L 63/0263 726/1 |

* cited by examiner

METHOD AND SYSTEM OF VIRTUAL DESKTOP INFRASTRUCTURE DEPLOYMENT STUDIO

FIELD

The present disclosure relates generally to virtual desktop infrastructure (VDI), and particularly to a method and system of a VDI deployment studio.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Remote desktop virtualization implementations operate as client/server computing environments. Application execution takes place on a virtual desktop of a virtual machine which is linked to the local client device over a network or a cloud using a remote display protocol through which the user interacts with applications. All applications and data used remain on the virtual machine with only display, keyboard, and mouse information communicated with the local client device which may be a conventional personal computer, a laptop computer, a thin client device, a tablet, or even a smartphone. A common implementation of this approach is to host multiple desktop operating system instances on a virtual machine hardware platform running a hypervisor. This is generally referred to as "Virtual Desktop Infrastructure" or "VDI".

Remote desktop virtualization is frequently used in the following scenarios: (a) In distributed environments with high availability requirements and where desk-side technical support is not readily available, such as branch office and retail environments, (b) in environments where high network latency degrades the performance of conventional client/server applications, (c) In environments where remote access and data security requirements create conflicting requirements that can be addressed by retaining all (application) data within the data center with only display, keyboard, and mouse information communicated with the remote client, (d) It is also used as a means of providing access to Windows applications on non-Windows endpoints including tablets, smart phones and non-Windows-based desktop PCs and laptops, and (e) Remote desktop virtualization is also used as a means of resource sharing, to provide low-cost desktop computing services in environments where providing every user with a dedicated desktop PC is either too expensive or otherwise unnecessary.

Deployment of such a VDI is a very complex task. It involves large amount of hardware configuration, software configuration, virtual machine configuration, virtual desktop configuration, and user configuration. Conventionally, most of such deployment is done locally, and involves intensive and manual installations and configurations. Such a deployment is tedious, unreliable, difficult and prone to errors. Therefore, it is desirable to devise a virtual desktop infrastructure (VDI) deployment system to deploy a VDI systematically, automatically, and remotely to ensure speedy low cost deployment, and to allow an administrator of the VDI to upgrade, install, refresh hundreds of virtual desktop nodes all from one central, remote location.

Therefore, an unaddressed need exists in the art to address the aforementioned deficiencies and inadequacies.

SUMMARY

In one aspect, the present disclosure relates to a virtual desktop deployment system for deploying a virtual desktop infrastructure. In certain embodiments, the virtual desktop deployment system has: (a) one or more of virtual desktop servers, (b) a computer server, and (c) a virtual desktop deployment entity. The virtual desktop servers are configured to host the virtual desktop infrastructure. The virtual desktop infrastructure includes one or more of virtual machines, and one or more virtual desktops are provided to one or more users. The computer server is configured to deploy the virtual desktop infrastructure by a system administrator. In certain embodiments, the computer server further includes a deployment database for storing virtual desktop infrastructure configuration and system settings. The virtual desktop deployment entity performs one or more of following operations: (a) receiving configuration and system settings of the virtual desktop infrastructure from the system administrator or a user, (b) discovering the hardware, the software, and the network configuration of the virtual desktop servers, and storing the configuration and system settings discovered into the deployment database, (c) scanning the hardware, software, services, roles of the virtual desktop infrastructure and existing network configuration to determine a minimum computer resource required by the virtual desktop infrastructure according to configuration and system settings received by the system administrator or the user, and storing the minimum computer resource into the deployment database, (d) configuring a set of deployment rules and deployment dependencies of the virtual desktop infrastructure, scheduling deployment jobs, and storing the set of deployment rules and deployment dependencies and the scheduled deployment jobs into the deployment database, (e) initiating a session to establish connection to the virtual desktop servers, (f) reading the virtual desktop infrastructure configuration and system settings from the deployment database, (g) deploying the virtual desktop infrastructure to the virtual desktop servers, and (h) generating status reports of the virtual desktop infrastructure deployment, and storing the status, the reports, and the logs of the virtual desktop infrastructure deployment into the deployment database.

In certain embodiments, the virtual desktop deployment entity includes following modules: (a) a user interface (UI) module, (b) a deployment status module, (c) a report module, (d) a configuration module, (e) a session module, (f) a deployment module, (g) a database abstraction (DBA) module, (h) a discovery module, and (i) a pre-requisite module.

The user interface (UI) module allows the system administrator or a user to enter configuration and system settings of the virtual desktop infrastructure, to add a set of deployment rules and dependencies, to create work flow, to schedule one or more deployment jobs, to display the status of deployment of virtual desktop infrastructure, and to display deployment reports. The user interface (UI) module performs one or more of following operations: (a) receiving initial configuration and system settings from the system administrator, (b) receiving a template for configuring the virtual desktop servers as default values, (c) importing configuration and system settings of an existing virtual desktop infrastructure, (d) receiving customized configuration and system settings from the system administrator, (e) receiving updates of configuration and system settings from the system administrator, (f) receiving customized configuration and system settings from the user, (g) receiving updates of the configuration and system settings from the user, (h) exporting configuration and system settings of an existing virtual desktop infrastructure, and (i) storing the received configuration and system settings into the deployment database. The user interface module includes one or more of following interfaces: (a) a window desktop application configured to be accessible from a desktop computer, or a laptop computer, (b) a web user interface (Web UI) configured to be accessible through a communication network, or a cloud, (c) a command line interface (CLI) configured to be accessible from a desktop computer, a laptop computer or a thin client, and (d) a scripts interface configured to be accessible from a desktop computer, a laptop computer or a thin client.

The deployment status module monitors the status of the scheduled deployment jobs. The report module generates deployment reports on the configuration and system settings of the virtual desktop infrastructure, the status of the scheduled deployment jobs, and the schedules of the scheduled deployment jobs. The report module generates following deployment reports: (a) a hardware and software requirement report summarizing the minimum requirements for the virtual desktop infrastructure to be deployed, (b) a pre-requisites scan report for determining if the resource of the hardware and software of existing virtual desktop meets the pre-requisites of the virtual desktop infrastructure to be deployed, (c) a deployment status report showing the current deployment status, and (d) deployment logs showing all activities of the deployment of the virtual desktop infrastructure including all deployment actions performed, all failure actions performed, all validation failures, and all verification failures occurred during the deployment.

The configuration module sets up the set of deployment rules and dependencies of the virtual desktop infrastructure, and performs one or more of following operations: (a) defining the set of deployment rules, (b) adding one or more dependencies to each of the set of deployment rules, (c) adding at least one validation check point for each of the set of deployment rules for validation, and at least one dependency check point for each of the set of deployment dependencies for verification, (d) adding at least one deployment action to implement each of the set of deployment rules, (e) adding at least one validation procedure to validate each deployment rule, and at least one verification procedure to verify the dependency check point, after the deployment action is performed, (f) defining at least one failure action for each deployment action when the deployment action is determined to be a failure through the validation procedure, wherein the deployment action is determined to be a failure when the validation check point was not validated successfully, or dependency check point was not verified successfully, (g) defining at least one roll back action to reverse the action when the validation procedure is determined to be a failure, and (h) storing the set of deployment rules and dependencies, the validation check points, the dependency check points, the deployment actions, the validation procedures, the verification procedures, the failure actions, and the roll back actions to the deployment database.

The session module manages the communication between the virtual desktop deployment entity and the virtual desktop servers using window management instrumentation (WMI) or PowerShell interface. The session module initiates at least one session to perform one or more of following operations: (a) establishing communication between the modules of the virtual desktop deployment entity and virtual desktop servers, (b) discovering the hardware of the virtual desktop servers, and existing network configuration using the discovery module, (c) scanning the hardware, software, services, roles of virtual desktop infrastructure and existing network configuration using the pre-requisite module, (d) configuring the set of deployment rules and dependencies of the virtual desktop infrastructure using the configuration module, (e) deploying the virtual desktop infrastructure using the deployment module, (f) generating reports of the virtual desktop infrastructure deployment by using the report module, and (g) rolling back of the virtual desktop infrastructure deployment using the deployment module when one or more failures are determined through the validation procedures and verification of the set of the deployment rules and dependencies.

The discovery module receives input of information of the virtual desktop servers, and user credentials, and to discover hardware and software of the virtual desktop servers, to perform IP/name based device discovery. The discovery module performs one or more of following discovery operations: (a) discovering the hardware of the virtual desktop servers, (b) obtaining the detail resource information of the hardware of the virtual desktop servers, including center processing units (CPUs), the size of the memory installed, the size of storage spaces, and (c) discovering the existing network configuration, including the DHCP server, the IP addresses of each of the virtual desktop servers.

The deployment module executes the scheduled deployment jobs to deploy a role/software as a task on the session module. The database abstraction (DBA) module implement database abstraction in a DBA library, and implement data manipulation commands received from the system administrator. The pre-requisite module scans the hardware, software, services, roles of the virtual desktop infrastructure discovered by the discovery module to determine if the hardware, software, services, roles of the current virtual desktop infrastructure meet pre-requisites of the virtual desktop infrastructure to be deployed based on the received configuration and system settings. The deployment database includes one of: a SQLite database, a PostgreSQL database, and an SQL server.

In certain embodiments, the virtual desktop deployment entity also performs one or more of following operations: (a) validating the validation check point and verifying the dependency check point after each deployment action is performed, (b) retrieving the at least one failure action associated with the deployment action if the results of the validation procedure and the verification procedure determine that the deployment action failed, and (c) performing the at least one failure action. The failure actions include: (a) a pause and retry action is taken when the deployment is paused and and manual operations are performed by the system administrator to correct the failure, (b) an alternate path action for each validation check point is taken when the validation check point is determined to be a failure, (c) a roll back action is taken when all deployment actions that caused failures of the validation of the validation check point and verification of the dependency check point will be reversed, (d) a quit action is taken when the execution of the virtual desktop deployment operation ends, and (e) an ignore/skip action is taken to move on to the next rule. The ignore action is performed if the validation check point is determined to be a failure. The skip action is performed if the dependency check point is determined to be a failure.

The pre-requisite module includes a virtual desktop management console. The virtual desktop management console performs one or more of following operations: (a) obtaining the detail resource information of the software of the virtual desktop servers, including the type of the operation systems, the versions of the operating system installed, and the service packs of the operating system installed, (b) entering hardware requirements of the virtual desktop infrastructure, including the center processing units (CPUs), the size of the memory, the size of storage spaces, and the minimum network requirements, (c) entering software requirements of the virtual desktop infrastructure, including the types of the operation systems, the versions of the operating system, and the service packs of the operating system, (d) entering configuration and system settings, including active directory role, remote desktop service role, hypervisor role, and file sharing role, and (e) storing the configuration and system settings in the deployment database.

In certain embodiments, the operation of deploying the virtual desktop infrastructure further includes one or more of following operations: (a) providing database abstraction of the virtual desktop infrastructure at the deployment database, (b) scheduling one or more virtual desktop infrastructure deployment jobs, (c) executing the scheduled virtual desktop infrastructure deployment jobs using the session module to deploy the virtual desktop infrastructure, (d) performing background processing and parallel executions for simultaneous deployment jobs, (e) updating the deployment status to the deployment database, and (f) generating reports of the status of the virtual desktop infrastructure deployment. The deployment job includes one or more of following operations: (a) installing operating system to each of the virtual desktops, (b) enabling operating system roles of each of the virtual desktops, (c) installing software packages according to the configuration and system settings, (d) executing scripts for updating registry settings and firewall configuration, and (e) preparing the virtual desktop manager by configuring web server ports, creating share path, and updating deployment database.

In certain embodiments, the virtual desktop deployment system further includes a virtual desktop manager. The virtual desktop manager has: (a) a window remote management software for implementing web services for management protocol, (b) a windows management instrumentation for implementing web-based enterprise management and common information model standard, (c) a redistributable window operating system, (d) a RAM disk driver, (e) a data share path, and (f) an operating system de-duplication system.

In another aspect, the present disclosure relates to a computer-implemented method for deploying a virtual desktop infrastructure using a virtual desktop deployment system. In certain embodiments, the computer-implemented method includes following operations: (a) receiving configuration and system settings of the virtual desktop infrastructure from a system administrator or a user, (b) discovering the hardware, the software, and the network configuration of one or more virtual desktop servers hosting the virtual desktop infrastructure, and storing the configuration and system settings discovered into a deployment database, (c) scanning the hardware, software, services, roles of the virtual desktop infrastructure and existing network configuration to determine a minimum computer resource required by the virtual desktop infrastructure according to the received configuration and system settings, and storing the minimum computer resource into the deployment database, (d) configuring a set of deployment rules and deployment dependencies of the virtual desktop infrastructure, scheduling deployment jobs, and storing the set of deployment rules and deployment dependencies and the scheduled deployment jobs into the deployment database, (e) initiating a session to establish connection to the virtual desktop servers, (f) reading the virtual desktop infrastructure configuration and system settings from the deployment database, (g) deploying the virtual desktop infrastructure on the virtual desktop servers, and (h) generating status reports of the virtual desktop infrastructure deployment, and storing the status, the reports, and the logs of the virtual desktop infrastructure deployment into the deployment database.

In certain embodiments, the virtual desktop infrastructure includes one or more virtual machines and each of the virtual machines includes one or more virtual desktops for one or more users. The virtual desktop deployment system has: (a) a computer server, (b) a virtual desktop deployment entity, and (c) one or more virtual desktop servers. The computer server is configured to deploy the virtual machines by the system administrator, and the computer server further includes a deployment database for storing virtual desktop infrastructure configuration and system settings.

In certain embodiments, the virtual desktop deployment entity includes following modules: (a) a user interface (UI) module, (b) a deployment status module, (c) a report module, (d) a configuration module, (e) a session module, (f) a deployment module, (g) a database abstraction (DBA) module, (h) a discovery module, and (i) a pre-requisite module.

The user interface (UI) module allows the system administrator or a user to enter configuration and system settings of the virtual desktop infrastructure, to add a set of deployment rules and dependencies, to create work flow, to schedule one or more deployment jobs, to display the status of deployment of virtual desktop infrastructure, and to display deployment reports. The user interface (UI) module performs one or more of following operations: (a) receiving initial configuration and system settings from the system administrator, (b) receiving a template for configuring the virtual desktop servers as default values, (c) importing configuration and system settings of an existing virtual desktop infrastructure, (d) receiving customized configuration and system settings from the system administrator, (e) receiving updates of configuration and system settings from the system administrator, (f) receiving customized configuration and system settings from the user, (g) receiving updates of the configuration and system settings from the user, (h) exporting configuration and system settings of an existing virtual desktop infrastructure, and (i) storing the received configuration and system settings into the deployment database. The user interface module includes one or more of following interfaces: (a) a window desktop application configured to be accessible from a desktop computer, or a laptop computer, (b) a web user interface (Web UI) configured to be accessible through a communication network, or a cloud, (c) a command line interface (CLI) configured to be accessible from a desktop computer, a laptop computer or a thin client, and (d) a scripts interface configured to be accessible from a desktop computer, a laptop computer or a thin client.

The deployment status module monitors the status of the scheduled deployment jobs. The report module generates deployment reports on the configuration and system settings of the virtual desktop infrastructure, the status of the scheduled deployment jobs, and the schedules of the scheduled deployment jobs. The report module generates following deployment reports: (a) a hardware and software requirement report summarizing the minimum requirements for the virtual desktop infrastructure to be deployed, (b) a pre-requisites scan report for determining if the resource of the hardware and software of existing virtual desktop meets the pre-requisites of the virtual desktop infrastructure to be deployed, (c) a deployment status report showing the current deployment status, and (d) deployment logs showing all activities of the deployment of the virtual desktop infrastructure including all deployment actions performed, all failure actions performed, all validation failures, and all verification failures occurred during the deployment.

The configuration module sets up the set of deployment rules and dependencies of the virtual desktop infrastructure, and performs one or more of following operations: (a) defining the set of deployment rules, (b) adding one or more dependencies to each of the set of deployment rules, (c) adding at least one validation check point for each of the set of deployment rules for validation, and at least one dependency check point for each of the set of deployment dependencies for verification, (d) adding at least one deployment action to implement each of the set of deployment rules, (e) adding at least one validation procedure to validate each deployment rule, and at least one verification procedure to verify the dependency check point, after the deployment action is performed, (f) defining at least one failure action for each deployment action when the deployment action is determined to be a failure through the validation procedure, wherein the deployment action is determined to be a failure when the validation check point was not validated successfully, or dependency check point was not verified successfully, (g) defining at least one roll back action to reverse the action when the validation procedure is determined to be a failure, and (h) storing the set of deployment rules and dependencies, the validation check points, the dependency check points, the deployment actions, the validation procedures, the verification procedures, the failure actions, and the roll back actions to the deployment database.

The session module manages the communication between the virtual desktop deployment entity and the virtual desktop servers using window management instrumentation (WMI) or PowerShell interface. The session module initiates at least one session to perform one or more of following operations: (a) establishing communication between the modules of the virtual desktop deployment entity and virtual desktop servers, (b) discovering the hardware of the virtual desktop servers, and existing network configuration using the discovery module, (c) scanning the hardware, software, services, roles of virtual desktop infrastructure and existing network configuration using the pre-requisite module, (d) configuring the set of deployment rules and dependencies of the virtual desktop infrastructure using the configuration module, (e) deploying the virtual desktop infrastructure using the deployment module, (f) generating reports of the virtual desktop infrastructure deployment by using the report module, and (g) rolling back of the virtual desktop infrastructure deployment using the deployment module when one or more failures are determined through the validation procedures and verification of the set of the deployment rules and dependencies.

The discovery module receives input of information of the virtual desktop servers, and user credentials, and to discover hardware and software of the virtual desktop servers, to perform IP/name based device discovery. The discovery module performs one or more of following discovery operations: (a) discovering the hardware of the virtual desktop servers, (b) obtaining the detail resource information of the hardware of the virtual desktop servers, including center processing units (CPUs), the size of the memory installed, the size of storage spaces, and (c) discovering the existing network configuration, including the DHCP server, the IP addresses of each of the virtual desktop servers.

The deployment module executes the scheduled deployment jobs to deploy a role/software as a task on the session module. The database abstraction (DBA) module implement database abstraction in a DBA library, and implement data manipulation commands received from the system administrator. The pre-requisite module scans the hardware, software, services, roles of the virtual desktop infrastructure discovered by the discovery module to determine if the hardware, software, services, roles of the current virtual desktop infrastructure meet pre-requisites of the virtual desktop infrastructure to be deployed based on the received configuration and system settings.

In certain embodiments, the virtual desktop deployment entity also performs one or more of following operations: (a) validating the validation check point and verifying the dependency check point after each deployment action is performed, (b) retrieving the at least one failure action associated with the deployment action if the results of the validation procedure and the verification procedure determine that the deployment action failed, and (c) performing the at least one failure action. The failure actions include: (a) a pause and retry action is taken when the deployment is paused and manual operations are performed by the system administrator to correct the failure, (b) an alternate path action for each validation check point is taken when the validation check point is determined to be a failure, (c) a roll back action is taken when all deployment actions that caused failures of the validation of the validation check point and verification of the dependency check point will be reversed, (d) a quit action is taken when the execution of the virtual desktop deployment operation ends, and (e) an ignore/skip action is taken to move on to the next rule. The ignore action is performed if the validation check point is determined to be a failure. The skip action is performed if the dependency check point is determined to be a failure.

The pre-requisite module includes a virtual desktop management console. The virtual desktop management console performs one or more of following operations: (a) obtaining the detail resource information of the software of the virtual desktop servers, including the type of the operation systems, the versions of the operating system installed, and the service packs of the operating system installed, (b) entering hardware requirements of the virtual desktop infrastructure, including the center processing units (CPUs), the size of the memory, the size of storage spaces, and the minimum network requirements, (c) entering software requirements of the virtual desktop infrastructure, including the types of the operation systems, the versions of the operating system, and the service packs of the operating system, (d) entering configuration and system settings, including active directory role, remote desktop service role, hypervisor role, and file sharing role, and (e) storing the configuration and system settings in the deployment database.

In certain embodiments, the operation of deploying the virtual desktop infrastructure further includes one or more of following operations: (a) providing database abstraction of the virtual desktop infrastructure at the deployment database, (b) scheduling one or more virtual desktop infrastructure deployment jobs, (c) executing the scheduled virtual desktop infrastructure deployment jobs using the session module to deploy the virtual desktop infrastructure, (d) performing background processing and parallel executions for simultaneous deployment jobs, (e) updating the deployment status to the deployment database, and (f) generating reports of the status of the virtual desktop infrastructure deployment. The deployment job includes one or more of following operations: (a) installing operating system to each of the virtual desktops, (b) enabling operating system roles of each of the virtual desktops, (c) installing software packages according to the configuration and system settings, (d) executing scripts for updating registry settings and firewall configuration, and (e)

preparing the virtual desktop manager by configuring web server ports, creating share path, and updating deployment database.

In yet another aspect, the present disclosure relates to non-transitory computer storage medium. The non-transitory computer storage medium stores computer-executable instructions. When executed by a processor of virtual desktop deployment system for deploying a virtual desktop infrastructure, these computer-executable instructions cause the processor to perform one or more of the following operations: (a) receiving configuration and system settings of the virtual desktop infrastructure from a system administrator or a user, (b) discovering the hardware, the software, and the network configuration of a virtual desktop servers for hosting the virtual desktop infrastructure, and storing the configuration and system settings discovered into a deployment database, (c) scanning the hardware, software, services, roles of the virtual desktop infrastructure and existing network configuration to determine a minimum computer resource required by the virtual desktop infrastructure according to the received configuration and system settings, and storing the minimum computer resource into the deployment database, (d) configuring a set of deployment rules and deployment dependencies of the virtual desktop infrastructure, scheduling a set of deployment jobs, and storing the set of deployment rules and deployment dependencies and the scheduled deployment jobs into the deployment database, (e) initiating a session to establish connection to the virtual desktop servers, (f) reading the virtual desktop infrastructure configuration and system settings from the deployment database, (g) deploying the virtual desktop infrastructure on the virtual desktop servers, and (h) generating status reports of the virtual desktop infrastructure deployment, and storing the status, the reports, and the logs of the virtual desktop infrastructure deployment into the deployment database.

In certain embodiments, the virtual desktop deployment system includes: (a) a computer server for deploying virtual desktop infrastructure by the system administrator, and the deployment database for storing virtual desktop infrastructure configuration and system settings, (b) a virtual desktop deployment entity configured to perform the operation of deploying the virtual desktop infrastructure, and (c) the virtual desktop servers configured to host the virtual desktop infrastructure. The virtual desktop infrastructure includes one or more virtual machines, and each of the one or more virtual machines includes one or more virtual desktops for one or more users to access.

In certain embodiments, the virtual desktop deployment entity includes following modules: (a) a user interface (UI) module for allowing the system administrator or a user to enter configuration and system settings of the virtual desktop infrastructure, to add the set of deployment rules and dependencies, to create work flow, to schedule the deployment jobs, to display the status of deployment of virtual desktop infrastructure, and to display deployment reports, (b) a deployment status module for monitoring the status of the scheduled deployment jobs, (c) a report module for generating one or more deployment reports on the configuration and system settings of the virtual desktop infrastructure, the schedule and the status of the scheduled deployment jobs, (d) a configuration module for setting up the set of deployment rules and dependencies of the virtual desktop infrastructure, (e) a session module for managing the communication between the virtual desktop deployment entity and the virtual desktop servers using window management instrumentation (WMI) or PowerShell interface, (f) a deployment module for performing the scheduled deployment jobs to deploy a role/software as a task on the session module, (g) a database abstraction (DBA) module for implementing database abstraction in a DBA library, and implementing data manipulation commands received from the system administrator, (h) a discovery module for receiveing input of information of the virtual desktop servers, and user credentials, and discovering hardware and software of the virtual desktop servers, to perform IP/name based device discovery, and (i) a pre-requisite module for scanning the hardware, software, services, roles of virtual desktop infrastructure discovered by the discovery module to determine if the hardware, software, services, roles of current virtual desktop infrastructure meet pre-requisites of the virtual desktop infrastructure to be deployed based on the configuration and system settings received.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings FIGS. 1-4. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
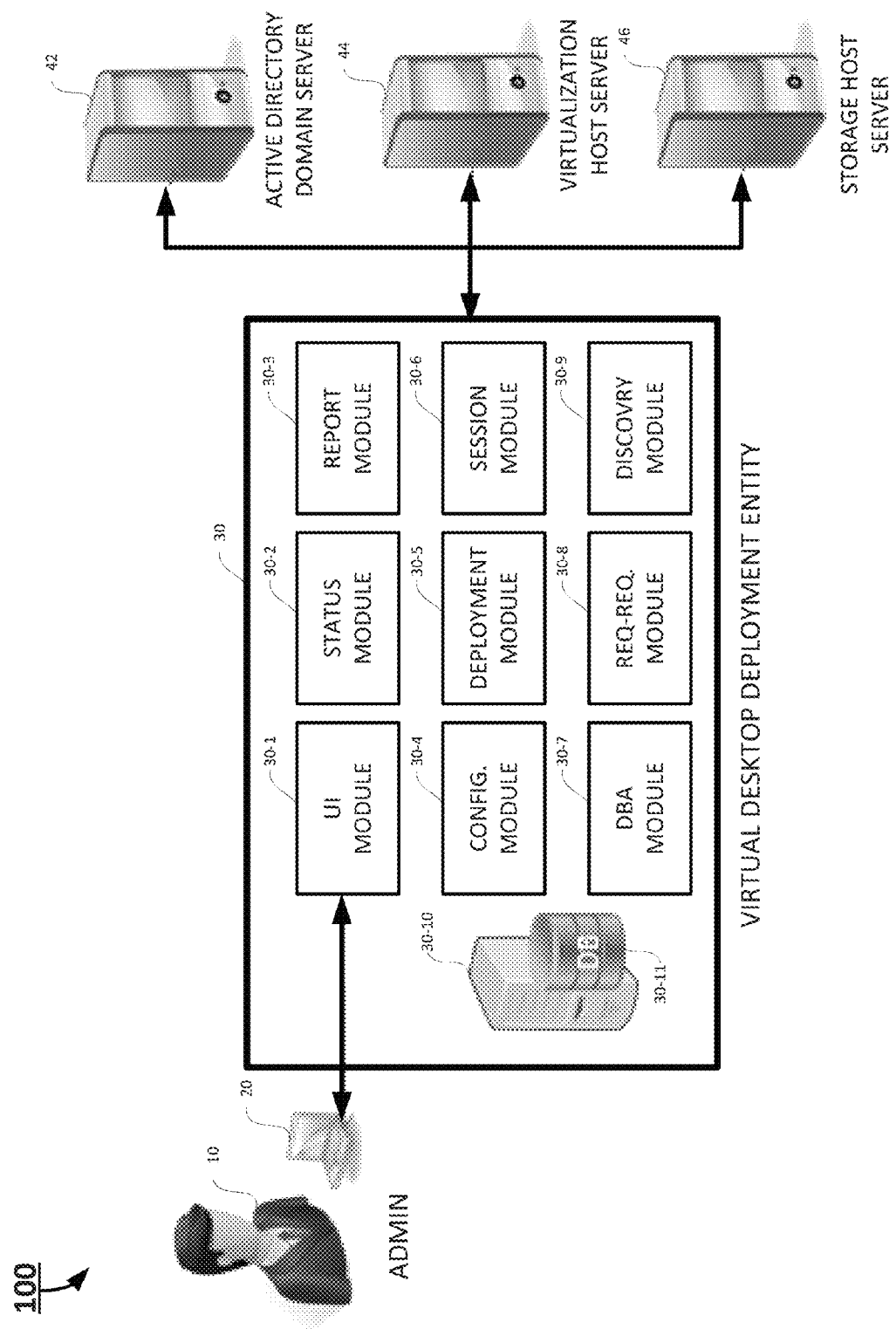
FIG. 1 schematically depicts a virtual desktop deployment system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The present disclosure will now be described more fully hereinafter with reference to the accompanying drawings, FIGS. 1-4, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art. Like numbers refer to like elements throughout.

In one aspect, the present disclosure relates to a virtual desktop deployment system 100 as shown in FIG. 1 according to certain embodiments of the present disclosure. The virtual desktop deployment system 100 includes: (a) a client computer 20 used by a system administrator 10, (b) virtual desktop deployment entity 30, and (c) one or more virtual desktop servers. In one embodiment, the virtual desktop deployment entity 30 is operating on a separate deployment computer 30-10 and the deployment computer 30-10 has a deployment database 30-11. The deployment database 30-11 is configured to store configuration and system settings of the virtual desktop infrastructure.

A hypervisor is installed on a virtualization host server, which in turn can run one or more virtual machines. One or more virtual desktops may be installed on each virtual machine and provide virtual desktop services to users. In certain embodiments, the users may access the virtual desktops configured on different virtual machines, and different hypervisors. These hypervisors, the virtual machines and the virtual desktops form a virtual desktop infrastructure. The present disclosure is directed to configuration and deployment of such a virtual desktop system.

In certain embodiments, the virtual desktop deployment system further includes a virtual desktop manager. The virtual desktop manager has one or more of following: (a) a remote management software, (b) a management instrumentation (e.g., Windows Management Instrumentation), (c) a redistributable operating system, (d) a RAM disk driver, (e) a data share path, and (f) an operating system de-duplication system. The remote management software is configured to implement web services for management protocol. The management instrumentation is configured to implement web-based enterprise management and common information model standard. The virtual desktop manager will have at least one copy of the redistributable operating system for installation onto each of the virtual desktops. Each of the virtual desktop may be configured differently and it may requirement certain components of the operating system. The operating system de-duplication system is used to reduce the storage of repeated components of the operating system.

In certain embodiments, the virtual desktop servers include: (a) an active directory domain server 42, (b) a virtualization host server 44, and (c) a storage host server 46. The active directory domain server 42 provides network support to the virtual desktop infrastructure, including the active directory roles, the remote desktop service roles, hypervisor roles, and file sharing roles. The virtualization host server 44 has sufficient hardware resources to host and run one or more virtual machines, which in turn can support one or more virtual desktops. The storage host server 46 can be configured to host all the user data for the virtual machines, the virtual desktops, and all the users who use the virtual desktop system. In certain embodiments, the virtual desktop servers may be combined into one server for a small to medium size virtual desktop infrastructure. In certain embodiments, each of the active directory domain server 42, the virtualization host server 44, and the storage host server 46 may be broken into one or more separate servers for a virtual desktop infrastructure that has a very large number of virtual desktops.

In certain embodiments, as shown in FIG. 1, the virtual desktop deployment entity 30 has one or more of following modules: (a) a user interface module 30-1, (b) a deployment status module 30-2, (c) a report module 30-3, (d) a configuration module 30-4, (e) a deployment module 30-5, (f) a session module 30-6, (g) a database abstract module 30-7, (h) a pre-requisite module 30-8, and (i) a discovery module 30-9.

In certain embodiments, the user interface module 30-1 is configured to allow the system administrator or a user to enter configuration and system settings of the virtual desktop infrastructure, to add certain deployment rules and dependencies, to create work flow, to schedule one or more deployment jobs, to display the status of deployment of virtual desktop infrastructure, and to display deployment reports. In one embodiment, the system administrator 10 may access the user interface module 30-1 through the client computer 20 using a web interface through a network. In another embodiment, the virtual desktop deployment entity 30 is operating on the computer 20, and the system administrator 10 may access the user interface module 30-1 through the client computer 20 using a command line user interface.

In certain embodiments, the user interface module 30-1 is configured to perform one or more of following operations: (a) receiving initial configuration and system settings from the system administrator 10, (b) receiving a template for configuring the virtual desktop servers as default values, (c) importing configuration and system settings of an existing virtual desktop infrastructure, (d) receiving customized configuration and system settings from the system administrator 10, (e) receiving updates of configuration and system settings from the system administrator 10, (f) receiving customized configuration and system settings from the users, (g) receiving updates of the configuration and system settings from and the users, (h) exporting configuration and system settings of an existing virtual desktop infrastructure, and (i) storing the received configuration and system settings into the deployment database.

In certain embodiments, the user interface module 30-1 of the virtual desktop deployment entity 30 includes one or more of following interfaces: (a) a desktop application configured to be accessible from a desktop computer, a laptop computer or a thin client, (b) a web user interface (Web UI) configured to be accessible through a communication network, or a cloud, (c) a command line interface (CLI) configured to be accessible from a desktop computer, a laptop computer or a thin client, and (d) a scripts interface configured to be accessible from a desktop computer, a laptop computer or a thin client.

In certain embodiments, the deployment status module 30-2 is used to monitor the status of one or more scheduled deployment jobs, and display the status of certain background tasks scheduled or currently running The report module 30-3 is configured to generate one or more deployment reports on the configuration and system settings of the virtual desktop infrastructure, the status of the scheduled deployment jobs, and the schedules of the scheduled deployment jobs. The reports on the configuration and system settings of the virtual desktop infrastructure may include one or more of following reports: (a) a pre-requisites scan report configured to determine if the resource of the hardware and software of existing virtual desktop meets the pre-requisites of the virtual desktop infrastructure to be deployed, and (b) a hardware/software requirement report summarizing the minimum requirements for the virtual desktop infrastructure to be deployed. The deployment reports on the status of the scheduled deployment jobs may include one or more of following reports: (a) a deployment status report showing the current deployment status, and (b) one or more deployment logs showing all activities of the deployment of the virtual desktop infrastructure including all deployment actions performed, all failure actions performed, all validation failures, and all verification failures occurred during the deployment. In one embodiment, the deployment reports and deployment logs may be displayed on the user interface module 30-1. In another embodiment, the deployment reports and deployment logs may be exported as files in various different formats.

In certain embodiments, the configuration module 30-4 is configured to receive initial configuration and system settings such as server IP and user credentials from the system administrator 10 and the users using the user interface module 30-1, to collect hardware and software information from the virtual desktop servers 42, 44, and 46 using the pre-requisite module 30-8, to set up certain number of deployment rules and dependencies of the virtual desktop infrastructure, and to schedule one or more deployment jobs using the user interface module 30-1. In one embodiment, the configuration module 30-4 allows the system administrator 10 enter and set up the configuration and system settings of the virtual desktop infrastructure. In another embodiment, the system administrator 10 and a user can customize a specific virtual desktop based on the user's specific needs, and update the configuration and system settings. The configuration and system settings includes one or more of following: (a) the roles to be deployed including active directory roles, remote desktop server roles, hypervisor roles, and file sharing roles, (b) default configuration parameters values such as using a template for similar virtual desktops, (c) a set of deployment rules, (d) a set of deployment dependencies, (e) deployment workflow, (f) scheduling one or more deployment jobs, (g) storing the configuration and system settings in the deployment database 30-11, and (h) exporting the configuration and system settings as file such that the configuration and system settings can be reused for similar virtual desktop infrastructures.

In certain embodiments, the configuration module 30-4 of the virtual desktop deployment entity 30 is configured to perform one or more of following operations to define a set of deployment rules and dependencies of the virtual desktop infrastructure: (a) defining a set of deployment rules, (b) adding one or more dependencies to each of the set of deployment rules, (c) adding at least one validation check point for each of the deployment rules for validation, and at least one dependency check point for each of the deployment dependencies for verification, (d) adding at least one deployment action to implement each of the deployment rules, (e) adding at least one validation procedure to validate each deployment rule, and at least one verification procedure to verify the dependency check point, after the deployment action is performed, (f) defining at least one failure action for each deployment action when the deployment action is determined to be a failure through the validation procedure, (g) defining at least one roll back action to reverse the action when the validation procedure is determined to be a failure, and (h) storing the set of deployment rules and dependencies, the validation check points, the dependency check points, the deployment actions, the validation procedures, the verification procedures, the failure actions, and the roll back actions to the deployment database 30-11.

In certain embodiments, the session module 30-6 is configured to manage the communication between the virtual desktop deployment entity 30 and the virtual desktop servers 42, 44, and 46 using a management instrumentation or a PowerShell interface. When there is a need for the virtual desktop deployment entity 30 and the virtual desktop servers 42, 44, and 46 to communicate with each other, there is a need to establish a session. The session module 30-6 establish network connection among the virtual desktop deployment entity 30 and the virtual desktop servers 42, 44, and 46, allows the deployment module 30-5 to deploy a role or software as a task, allows the pre-requisite module 30-8 to run hardware requirement scan, and software requirement scan. The session module 30-6 implements task parallel library that allows multiple background jobs to run simultaneously. The interfaces such as window management instrumentation (WMI) and PowerShell interface may be used to establish the connection.

In certain embodiments, the session module 30-6 is configured to initiate a session and to perform one or more of following operations: (a) establishing communication among the modules of the virtual desktop deployment entity 30 and the virtual desktop servers, (b) discovering the hardware and software of the virtual desktop servers, and existing network configuration using the discovery module 30-9, (c) scanning the hardware, software, services, roles of virtual desktop infrastructure and existing network configuration using the pre-requisite module 30-8, (d) configuring the set of deployment rules and dependencies of the virtual desktop infrastructure using the configuration module 30-4, (e) deploying the virtual desktop infrastructure using the deployment module 30-5, (f) generating reports of the virtual desktop infrastructure deployment by using the report module 30-3, (g) rolling back of the virtual desktop infrastructure deployment using the deployment module 30-5 when one or more failures are determined through the validation procedures and verification of the set of the deployment rules and dependencies.

In certain embodiments, the deployment module 30-5 is configured to deploy the virtual desktop infrastructure. The deployment of the virtual desktop infrastructure includes performing one or more scheduled deployment jobs to deploy a role/software as a task on the session module 30-6. The deployment module 30-5 performs one or more of following operations: (a) installing and enabling operation system roles on each of the virtual desktops, (b) installing certain software packages such as RAM disk drivers, a virtual desktop manager, and host agents for the virtual desktops, (c) executing deployment scripts to update registry settings and firewall settings for the virtual desktops, and (d) preparing the virtual desktop manager including post installation configuration required for the virtual desktop manager such as web server port configurations, share path creation, and database updates.

In certain embodiments, the operation of deploying the virtual desktop infrastructure further includes one or more of following operations: (a) providing database abstraction of the virtual desktop infrastructure at the deployment database, (b) scheduling one or more virtual desktop infrastructure deployment jobs, (c) executing the scheduled virtual desktop infrastructure deployment jobs using the session module to deploy the virtual desktop infrastructure, (d) performing background processing and parallel executions for simultaneous deployment jobs, (e) updating the deployment status to the deployment database, and (f) generating reports of the status of the virtual desktop infrastructure deployment.

In certain embodiments, the deployment job includes one or more of following operations: (a) installing operating system to each of the virtual desktops, (b) enabling operating system roles of each of the virtual desktops, (c) installing software packages according to the configuration and system settings, (d) executing scripts for updating registry settings and firewall configuration, and (e) preparing the virtual desktop manager by configuring web server ports, creating share path, and updating deployment database.

In certain embodiments, the deployment module 30-5 of the virtual desktop deployment entity is further configured to perform one or more of following operations: (a) validating the validation check point and verifying the dependency check point after each deployment action is performed, (b) retrieving the at least one failure action associated with the deployment action if the results of the validation procedure and the verification procedure determine that the deployment action failed, and (c) performing the at least one failure action. The failure actions include: (a) a pause and retry action wherein the deployment of the virtual desktop infrastructure is paused and manual operations can be executed to correct the failure, (b) an alternate path action for each validation check point when the validation check point is determined to be a failure, (c) an ignore/skip action to move on to the next rule, an ignore action is performed if the validation check point is determined to be a failure, and a skip action is performed if the dependency check point is determined to be a failure, (d) a roll back action where all deployment actions that caused failures of the validation of the validation check point and verification of the dependency check point will be reversed, and (e) a quit action to end the execution of the virtual desktop deployment entity.

In certain embodiments, the database abstraction (DBA) module 30-7 is configured to implement database abstraction in a DBA library, and implement data manipulation commands received from the system administrator 10 from the user interface module 30-1. The database abstraction module 30-7 includes a database abstraction library, and a simple database base such as SQLite 3.

Before the virtual desktop infrastructure can be deployed, the system administrator 10 needs to gather hardware and software information about the virtual desktop servers. The hardware and software information is gathered by the discovery module 30-9. The discovery module 30-9 is configured to receive input of information of the virtual desktop servers and user credentials from the system administrator 10 or users through the user interface module 30-1, to connect to the virtual desktop servers 42, 44, and 46 through the session module 30-6, to discover hardware and software of the virtual desktop servers by performing IP/name based device discovery. The information gathered by the discovery module 30-9 represents what resources the virtual desktop infrastructure currently has. The discovery module 30-9 is further configured to obtain the detail resource information of the hardware of the virtual desktop servers, including center processing units (CPUs), the size of the memory installed, the size of storage spaces, and to discover the existing network configuration, including the DHCP server, the IP addresses of each of the virtual desktop servers.

In certain embodiments, the pre-requisite module 30-8 is configured to determine what minimum hardware and software resources requirements the virtual desktop infrastructure will need to have according to the configuration and system settings received from the system administrator 10. The pre-requisite module 30-8 scans the hardware, software, services, roles of virtual desktop infrastructure and existing network configuration to determine the minimum computer resources requirement the virtual desktop infrastructure will require according to configuration and system settings received from the system administrator 10 or users. If the hardware and software resources the virtual desktop infrastructure will need to have according to the configuration and system settings received from the system administrator 10 or the users is greater than what resources the virtual desktop infrastructure currently has, then the system administrator 10 has to add more resources to the virtual desktop infrastructure accordingly before the virtual desktop infrastructure is successfully deployed.

In certain embodiments, the pre-requisite module 30-8 also includes virtual desktop management console (not shown in FIG. 1). The virtual desktop management console is configured to perform one or more of following operations: (a) obtaining the detail resource information of the software of the virtual desktop servers, including the type of the operation systems, the versions of the operating system installed, and the service packs of the operating system installed, (b) entering hardware requirements of the virtual desktop infrastructure, including the center processing units (CPUs), the size of the memory, the size of storage spaces, and the minimum network requirements, (c) entering software requirements of the virtual desktop infrastructure, including the types of the operation systems, the versions of the operating system, and the service packs of the operating system, (d) entering configuration and system settings, including active directory role, remote desktop service role, hypervisor role, and file sharing role, and (e) storing the configuration and system settings in the deployment database.

The hardware requirements of the virtual desktop servers include the power of central processing units (CPUs), the size of the volatile and non-volatile memory, the size of total storage space such as hard disk drives and arrays, optical disk drives and arrays, and storage area network, and network configurations and speed. The software requirements of the virtual desktop servers include operating system type requirements, version requirements, and service pack requirements. Exemplary popular operating systems include Android, BSD, iOS, Linux, OS X, QNX, Microsoft Windows, Windows Phone, and IBM z/OS. If most users want to have virtual desktops in Window operating system environment, and this requirement is entered by the system administrator 10 during the configuration, the pre-requisite module 30-8 will add this requirement to the resources the virtual desktop infrastructure will have to have. If a user wants to have a virtual desktop in iOS environment, and this requirement is entered by the user during the configuration, then the pre-requisite module 30-8 will add this requirement to the resources the virtual desktop infrastructure will have to have, in addition to the Window operating system for the most users.

In certain embodiments, in addition to the hardware requirements, and software requirements for a virtual desktop infrastructure operating under Windows operating system environment, the pre-requisite module 30-8 may also include one or more of following requirements: (a) requirements for pre-installed services and roles such as active directory roles, remote desktop service roles, hypervisor roles, and file sharing roles, (b) Microsoft .Net Framework, (c) redistributables such as visual studio service pack, and (d) a virtual desktop manager. The virtual desktop manager requires: (a) Windows Remote Management (WinRM) configuration, (b) Windows Management Instrumentation (WMI) configuration, (c) RAM Disk Driver installation, (d) share path configuration, and (e) de-duplication configuration. The de-duplication configuration is used mainly for reducing storage space requirement for the same or similar operating system among a group of users.

The virtual desktop deployment entity 30 is configured to perform one or more of following operations:

receiving initial configuration and system settings of the virtual desktop infrastructure from the system administrator or the users using the user interface module 30-1, and storing the configuration and system settings received into the deployment database 30-11;

discovering the hardware, the software, and the network configuration of the virtual desktop servers using the discovery module 30-9, and storing the configuration and system settings discovered into the deployment database 30-11;

scanning the hardware, software, services, roles of virtual desktop infrastructure and existing network configuration to determine the minimum computer resource requirements the virtual desktop infrastructure will require according to configuration and system settings received by the system administrator or the users using the pre-requisite module 30-8, and storing the minimum computer resource requirements into the deployment database 30-11;

configuring a set of deployment rules and deployment dependencies of the virtual desktop infrastructure, scheduling one or more deployment jobs using the configuration module 30-4, and storing the set of deployment rules and deployment dependencies and the scheduled deployment jobs into the deployment database 30-11;

initiating a session to establish connection to the virtual desktop servers using the session module 30-6;

reading the virtual desktop infrastructure configuration and system settings from the deployment database 30-11;

deploying the virtual desktop infrastructure to the virtual desktop servers using the session module 30-6 and the deployment module 30-5; and generating status reports of the virtual desktop infrastructure deployment using the status module 30-2 and the report module 30-3, and storing the status, the reports, and the logs of the virtual desktop infrastructure deployment into the deployment database 30-11.

Figure 2:
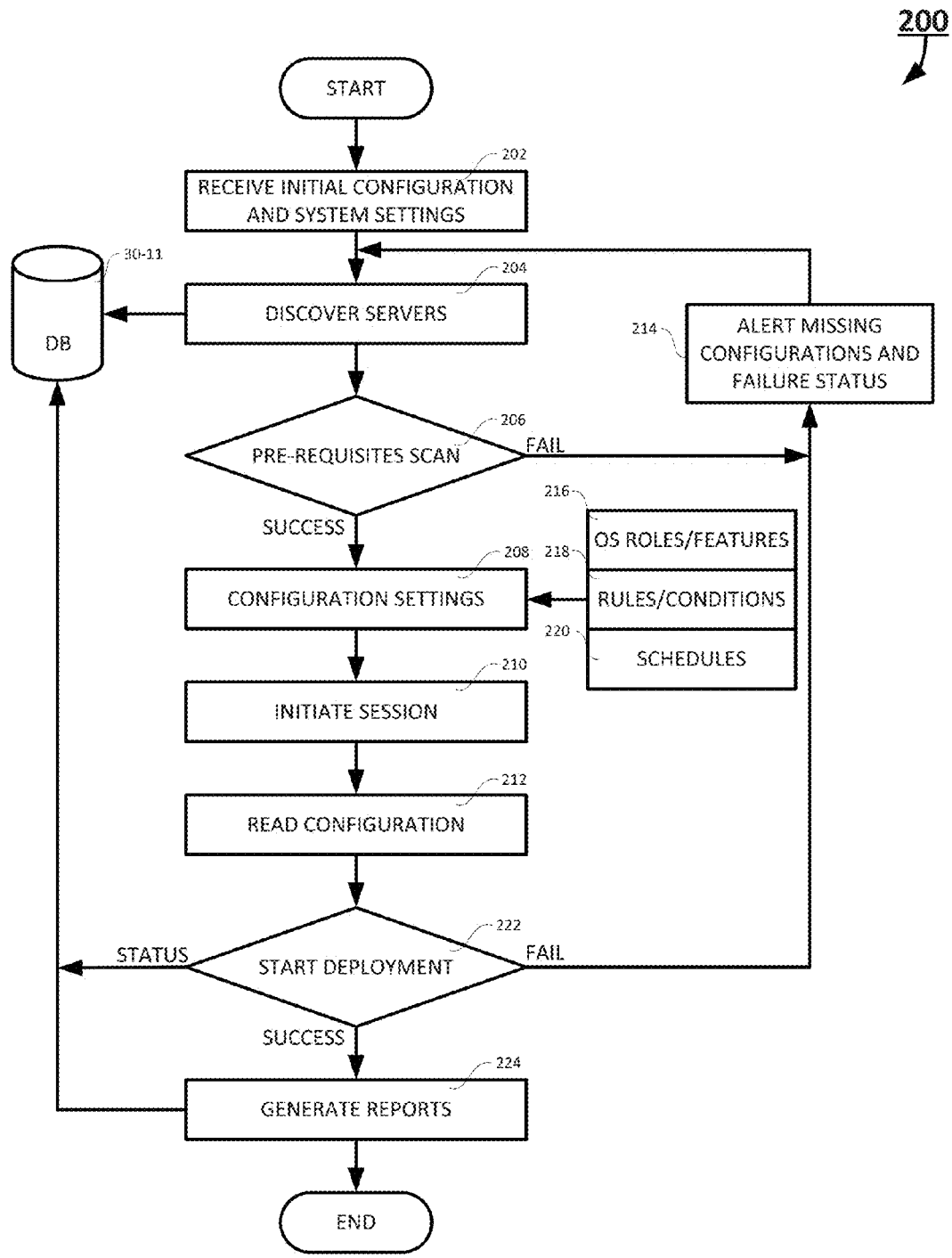
FIG. 2 shows a flow chart of the virtual desktop deployment system according to certain embodiments of the present disclosure.

Referring now to FIG. 2, a flow chart of a virtual desktop deployment system 200 is shown according to certain embodiments of the present disclosure. In certain embodiments, at the start up at operation 202, the system administrator 10 can use his or her client computer 20 to access the user interface module 30-1 of the virtual desktop deployment entity 30 to enter initial configuration and system settings of the virtual desktop infrastructure. These configuration and system settings can include the names and IP addresses of the virtual desktop servers: the active directory domain server 42, the virtualization host server 44, and the storage host server 46 as shown in FIG. 1. If the virtual desktop infrastructure includes more servers, these names and IP addresses of the additional servers should also be entered. The initial configuration and system settings may also include the number of total users, the usernames and passwords of the users, the number of total virtual desktops, and special requirements for certain users or certain virtual desktops. The information entered here by the system administrator 10 or certain users are stored in the deployment database 30-11.

At operation 204, the discovery module 30-9 is used to retrieve the names and IP addresses of the virtual desktop servers from the deployment database 30-11, and to discover the virtual desktop servers 42, 44, and 46. The session module 30-6 is used to establish the connection between the discovery module 30-9 of the virtual desktop deployment entity 30 and the virtual desktop servers 42, 44, and 46 to facilitate the communication among them. During this discovery process, the discovery module 30-9 gathers hardware, and software information from the virtual desktop servers 42, 44, and 46, such as the CPU type and power, the size of the RAM, ROM, the size of storage space such as hard disk drives or arrays, and optical disk drives or arrays, as well the configuration and the speed of the network. This discovery process gathers all the resource information of the virtual desktop infrastructure. The resource information of the virtual desktop infrastructure is stored in the deployment database 30-11.

At operation 206, the pre-requisite module 30-8 is used to retrieve the initial configuration and system settings from the deployment database 30-11, and determine the minimum requirements the virtual desktop infrastructure must have to support the number of users, and the number of virtual desktops of the virtual desktop infrastructure. The session module 30-6 is used to establish the connection between the pre-requisite module 30-8 of the virtual desktop deployment entity 30 and the virtual desktop servers 42, 44, and 46 to facilitate the communication among them. For hardware, the pre-requisite module 30-8 will determine the CPU resources, the size of RAM and ROM of the servers, the storage spaces of the storage host server 46, and what type of the network are needed to support the number of users, and virtual desktops received from the initial configuration and system settings at operation 202. For software, the pre-requisite module 30-8 will determine how many different types of operating system, what versions of these operating systems, and what service packs of the operating systems are needed to support the number of users, and virtual desktops received from the initial configuration and system settings at operation 202. This pre-requisite determination process gathers all the resource information of the virtual desktop infrastructure needs to support the number of users and virtual desktops required by the initial configuration and system settings in operation 202. The minimum requirements the virtual desktop infrastructure is stored in the deployment database 30-11.

The pre-requisite module 30-8 may retrieve the resource information of the virtual desktop infrastructure from the deployment database 30-11 and compare with the minimum requirements the virtual desktop infrastructure to determine whether the current virtual desktop infrastructure has sufficient resource to support the numbers of users and virtual desktops defined in operation 202. If the resources of the virtual desktop infrastructure is greater than or equal to the minimum requirements the virtual desktop infrastructure, then it is success, and the operation continues to operation 208. Otherwise, if the minimum requirements the virtual desktop infrastructure is greater than the resource of the virtual desktop infrastructure, then it is a failure, and the operation continues to operation 214. For example, if the number of users is 50, and each of them requires 10 GB hard drive space, we need to have a minimum of 500 GB for hard drive space. If the hard drive on the storage server 46 has 2 TB storage space, the comparison results a success. If the 48 of the 50 users require Windows operating system and 2 of them require Linux operation system, and the current virtual desktop servers do not have the Linux operating system installed, then the comparison results a failure.

At operation 214, when the pre-requisite module 30-8 detects any failures, missing configurations and failure status are sent to the system operator and the users to alert such missing configurations and failures. The system administrator 10 or the users may take action to add additional resources such as adding additional CPU, memory, storage space, and network to overcome the shortcoming of the resource of the virtual desktop infrastructure. In the example above, the Linux operating system may be installed on one or more of the virtual desktop servers 42, 44, and 46 to support the Linux operating system. Once the additional resources are added to the virtual desktop infrastructure, the operation continues to operation 204 to restart the server discovery and pre-requisite scanning At operation 208, the configuration module 30-4 is used to configure the configuration and system settings of the virtual desktop infrastructure. The configuration includes: configuring the operating system roles and features for each of the virtual desktop as shown in operation 216, a set of deployment rules and deployment dependencies of the virtual desktop infrastructure, and conditions as shown in operation 218, and to schedule one or more deployment jobs. Once the operating system roles and features, and the set of deployment rules and dependencies and conditions are successfully configured and the deployment jobs are scheduled, these operating system roles and features, and the set of deployment rules and dependencies and conditions, as well as the deployment job schedule are stored into the deployment database 30-11.

The deployment rules specify certain rules to follow for the deployment of the virtual desktop infrastructure. For example, an active directory domain server (AD-DS) should be configured first, and then, user information can be configured for the virtual desktop infrastructure. The deployment dependencies are a set of deployment actions that depend on each other. For example, if the virtual desktop infrastructure requires two deployment actions: (a) installation of a dynamic Host Configuration Protocol (DHCP) server, and (b) installation of Domain Name System (DNS). However, these two actions can't be performed at the same time. The DHCP server must be installed first before the installation of DNS. In this case, the dependency says DNS depends on DHCP, and the DNS will not be installed before the successful installation of the DHCP server. To ensure each of the deployment actions is performed successfully, at least one validation check point is added to each deployment action for validating the deployment action, and at least one dependency check point is added to each deployment action for verifying the deployment action.

In certain embodiments, the configuration module 30-4 of the virtual desktop deployment entity 30 is configured to perform one or more of following operations to define a set of deployment rules and dependencies of the virtual desktop infrastructure: (a) defining a set of deployment rules, (b) adding one or more dependencies to each of the set of deployment rules, (c) adding at least one validation check point for each of the deployment rules for validation, and at least one dependency check point for each of the deployment dependencies for verification, (d) adding at least one deployment action to implement each of the deployment rules, (e) adding at least one validation procedure to validate each deployment rule, and at least one verification procedure to verify the dependency check point, after the deployment action is performed, (f) defining at least one failure action for each deployment action when the deployment action is determined to be a failure through the validation procedure, (g) defining at least one roll back action to reverse the action when the validation procedure is determined to be a failure, and (h) storing the set of deployment rules and dependencies, the validation check points, the dependency check points, the deployment actions, the validation procedures, the verification procedures, the failure actions, and the roll back actions to the deployment database 30-11.

The deployment of the virtual desktop infrastructure can be scheduled at night to reduce the disruption to the computer system or network, especially caused by computer server system shut-downs. One or more deployment jobs can be scheduled to perform at various times or to be performed concurrently. The virtual desktop deployment entity will perform the deployment jobs according to the schedules stored in the deployment database 30-11. The deployment jobs include various separate deployment actions to perform, and each action implement at least one deployment rule.

At operation 210, at the scheduled time, the virtual desktop deployment entity 30 initiates a new session using the session module 30-6, to establish deployment session.

The session module 30-6 establishes the connection between the virtual desktop deployment entity 30 and the virtual desktop servers 42, 44, and 46 to facilitate the communication among them.

At operation 212, the deployment module 30-5 of the virtual desktop deployment entity 30 is used to read in the configuration and system settings, the set of deployment rules and dependencies, deployment actions from the deployment database 30-11, and prepare for virtual desktop infrastructure deployment.

At operation 222, each of the deployment actions are performed one by one according to the set of deployment rules and dependencies, and its validation check point is validated and its dependency check point is verified. If any of the validation check point or the dependency check point indicates a failure, the deployment process will halt and continues to operation 214 to deal with the failure. If all deployment actions are performed successfully, the virtual desktop infrastructure is deployed successfully and the deployment process continues to operation 224. Detailed description of how the virtual desktop infrastructure is deployed and how the virtual desktop deployment entity 30 handles the failures will be presented in the FIG. 4.

During the operation 222, as each of the deployment action is performed, the status of the virtual desktop infrastructure deployment and deployment logs are continuously updated to the deployment database 30-11 by the status module 30-2.

At operation 224, the report module 30-3 of the virtual desktop deployment entity 30 generates reports of the deployment of the virtual desktop infrastructure and stored the reports in the deployment database 30-11. The deployment of the virtual desktop infrastructure is concluded here.

Figure 3:
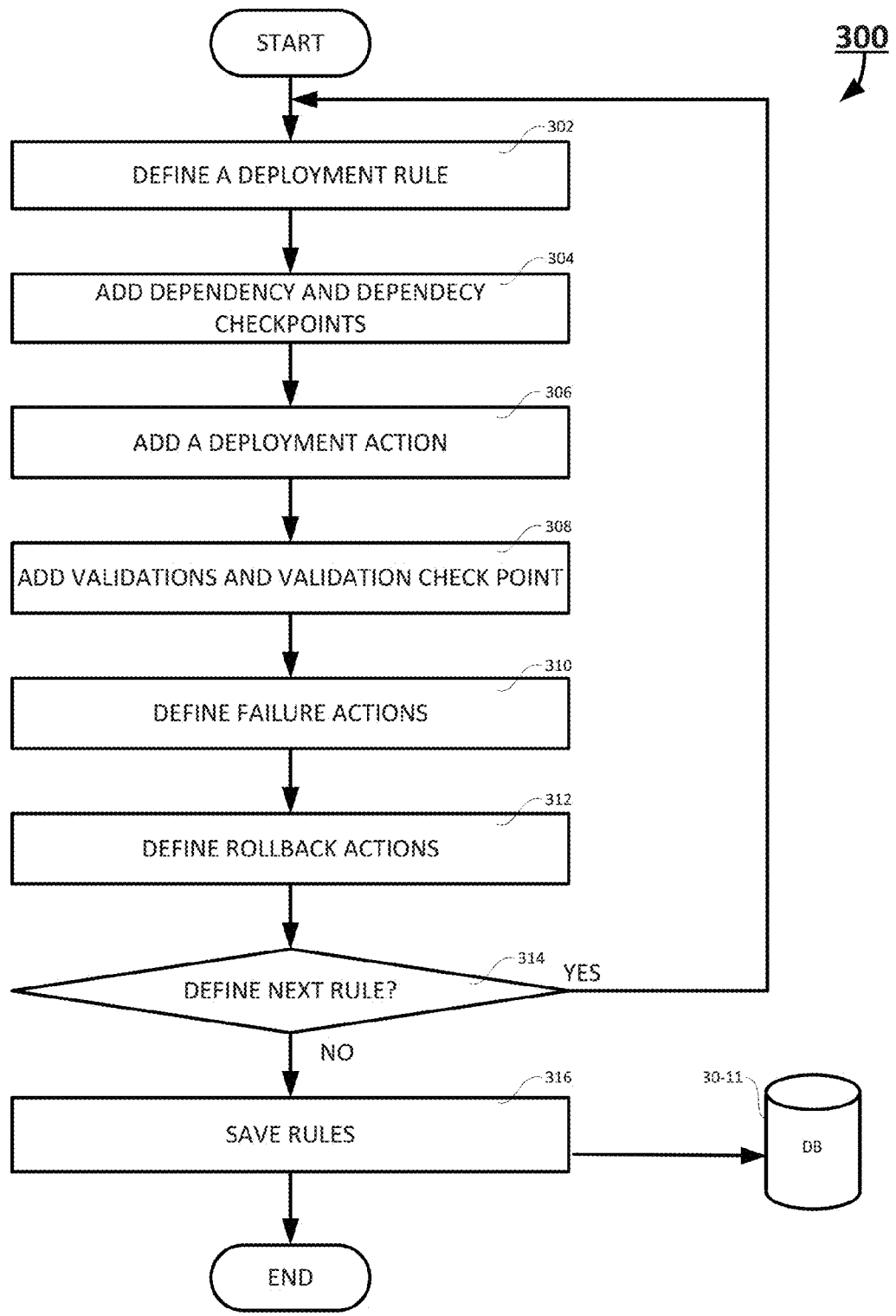
FIG. 3 shows a flow chart of a process of defining deployment rules and deployment dependencies of the virtual desktop deployment entity according to certain embodiments of the present disclosure.

Referring now to FIG. 3, a flow chart 300 of a process of defining deployment rules and dependencies of the virtual desktop deployment is shown according to certain embodiments of the present disclosure. At startup operation 302, the system administrator 10 may use the user interface module 30-1 to define a set of deployment rules. For example, the resources of the virtual desktop servers combined should be greater or at least equal to the resource of the virtual desktop infrastructure to be deployed (rule 1). When a user or a virtual desktop is added to the virtual desktop infrastructure, the user or the virtual desktop is add through the active directory domain server 42 (rule 2).

At operation 304, a set of deployment dependencies are defined by the system administrator 10 by using the user interface module 30-1. The successful implementation of rule 1 described above depends on if the resources of the virtual desktop infrastructure to be deployed and the resources of the virtual desktop servers combined can be determined. In this embodiment, the active directory domain server 42 is used. In certain embodiments, the virtual desktop infrastructure also includes a dynamic host configuration protocol (DHCP) server and a domain name server (DNS). In one embodiment, before Remote Desktop Services (RDS) Roles are installed, the virtual desktop servers must be installed and configured to be a part of a domain network. In another embodiment, .NET Framework 4 must be installed before the virtual desktop manager can be installed.

After the deployment dependencies are defined, at least one dependency check point is added to each dependency for a verification procedure. For example, for the rule 1, a first dependency check point is set to obtain the resources of the virtual desktop infrastructure, a second dependency check point is set to obtain the resources of the virtual desktop servers combined, and a third dependency check point is set to compare the resources of the virtual desktop infrastructure to be deployed and the resources of the virtual desktop servers combined. If the resources of the virtual desktop infrastructure are obtained, the first dependency check point is a success. If the resources of the virtual desktop servers combined are obtained, the second dependency check point is a success. If the resources of the virtual desktop servers combined is greater or at least equals to the resource of the virtual desktop infrastructure to be deployed, then the third dependency check point is a success. If all three dependency check points are successes, then the verification procedure is a success. If any one of the three dependency check points is a failure, then the verification procedure is a failure. For the rule 2, a first dependency check point is set to determine whether the DHCP protocol is configured, and a second dependency check point is set to determine whether a DNS server is installed and configured. If the DHCP protocol is configured, the first dependency check point is a success. If the DNS server is installed and configured, then the second dependency check point is a success. If both check dependency points are successes, then the verification procecdure is a success. If any one of the two dependency check points is a failure, then the verification procedure is a failure.

At operation 306, at least one deployment action is added to each of the deployment rules. Exemplary deployment action may include: installing and configuring Remote Desktop Services (RDS) Roles, installing Windows Operating system and related service packs, installing virtual desktop manager. In certain embodiments, for rule 1, the deployment action may include: (a) obtaining the resources of the virtual desktop infrastructure requirements based on the initial configuration and system settings the system administrator 10 entered, (b) obtaining the resources of the virtual desktop servers combined based on the hardware and software scans of the virtual desktop servers, and (c) comparing the resources of the virtual desktop infrastructure requirements with the resources of the virtual desktop servers. For rule 2, the deployment action includes: (a) scan the network settings of the virtual desktop servers to determine if the DHCP protocol is configured in the virtual desktop servers, and (b) scan the network settings of the virtual desktop server to determine if the DNS server is installed and configured.

At operation 308, at least one validation procedure is defined for each deployment action. In one embodiment, for the deployment action of installing and configuring Remote Desktop Services (RDS) Roles, a validation procedure is defined to check whether the Remote Desktop Services (RDS) Roles are installed successfully. In another embodiment, for the deployment action of installing virtual desktop manager, a corresponding validation procedure is defined to check whether the virtual desktop manager is installed successfully. In certain embodiments, for rule 1, the validation procedures include: (a) determining if the resources of the virtual desktop infrastructure requirements based on the initial configuration and system settings the system administrator 10 entered are obtained successfully, (b) determining if the resources of the virtual desktop servers combined based on the hardware and software scans of the virtual desktop servers are obtained successfully, and (c) determining if the resources of the virtual desktop servers are greater than or at least equal to the resources of the virtual desktop infrastructure requirements. For rule 2, the deployment action includes: (a) determining if the DHCP protocol is configured in the virtual desktop servers successfully, and (b) determining if the DNS server is installed and configured successfully.

After the validation procedures are defined, at least one validation check point is added to each validation procedure. For the validation procedure of checking whether the Remote Desktop Services (RDS) Roles are installed successfully, a check point is defined to evaluate the outcome of RDS installation result from the validation procedure. For the validation procedure of checking whether the virtual desktop manager is installed successfully, a check point is defined to evaluate the outcome of virtual desktop manager installation result from the validation procedure. The results may include a logic TRUE to indicate successful installation of RDS Roles or virtual desktop manager, and a logic FALSE to indicate unsuccessful installation of RDS Roles or virtual desktop manager. In certain embodiments, for the rule 1, a first validation check point is set to obtain the resources of the virtual desktop infrastructure requirements, a second validation check point is set to obtain resources of the virtual desktop servers combined, and a third validation check point is set to compare the resources of the virtual desktop servers combined with the resources of the virtual desktop infrastructure to be deployed. If the resources of the virtual desktop infrastructure requirements are obtained successfully, the first validation check point is a success. If the resources of the virtual desktop infrastructure are obtained successfully, the second validation check point is a success. If the resources of the virtual desktop servers combined is determined to be greater or at least equals to the resource of the virtual desktop infrastructure to be deployed, then the third validation check point is a success. In order to be successful for the third validation check point, the resources of the virtual desktop servers combined should be greater than or at least equal to the resource of the virtual desktop infrastructure to be deployed in every aspect of the resources such as hardware, software and network. If any of the aspects is determined to be a failure, then the third validation check point is a failure. If all three validation check points are successes, then the validation procedure for the deployment action is a success. If any one of the three validation check points is a failure, then the validation procedure is a failure. For the rule 2, a first validation check point is set to determine whether the DHCP protocol is configured, and a second validation check point is set to determine whether a DNS server is installed and configured. If the DHCP protocol is configured, the first validation check point is a success. If the DNS server is installed and configured, then the second validation check point is a success. If both validation check points are successes, then the validation procedure is a success. If any one of the two validation check points is a failure, then the validation procedure is a failure.

At operation 310, at least one failure action is defined for each of the deployment actions when a failure is determined by the validation procedures or verification procedures. The failure actions include: (a) a pause and retry action, (b) an alternate path action, (c) an ignore/skip action, (d) a roll back action, and (e) a quit action. The pause and retry action is performed when a failure is determined to exist, and the deployment of the virtual desktop infrastructure is paused such that certain manual operations by the system administrator 10 can be executed to correct the failure. The alternate path action for each validation check point when the validation check point is determined to be a failure, and an alternate path can be defined here and taken to correct the failure. For example, if the virtual desktop manager is installed successfully, and the database of the virtual desktop manager is not configured successfully from an installation task, then an alternate path may be defined by configuring the database of the virtual desktop manager by executing database configuration scripts. The ignore action is performed if the validation check point is determined to be a failure, and a skip action is performed if the dependency check point is determined to be a failure. The roll back action is performed when the validation check point is determined to be a failure, and the deployment action that caused failures of the validation procedure will be reversed. The quit action is performed when the system administrator 10 determines to end the execution of the virtual desktop deployment entity. In certain embodiments, if it is determined that RDS Roles were not installed successfully, the failure action may include to uninstall the RDS Roles that have already installed and remove the RDS Roles from the Domain Network.

If the virtual desktop manager is installed successfully, but the post installation configuration of the virtual desktop manager failed, then the virtual desktop manager must be uninstalled or removed.

At operation 312, when certain deployment actions are performed and the virtual desktop infrastructure becomes not stable and various failures are detected, then in order to maintain stability of the virtual desktop infrastructure, at least one failure action needs to be defined and associated with each of these deployment actions. If the virtual desktop manager is installed successfully, but the post installation configuration of the virtual desktop manager failed, then the virtual desktop manager must be uninstalled or removed. For example, a deployment action is to add a first user and a second user to the virtual desktop infrastructure. The first user requires 10 GB hard drive storage space, and the second user requires 20 GB hard drive storage space. Therefore the deployment action here includes: (a) adding the first user to the active directory domain server 42, (b) allocating 10 GB hard drive storage space for the first user in the storage host server 46, (c) adding the second user to the active directory domain server 42, (b) allocating 40 GB hard drive storage space for the second user in the storage host server 46.

The current storage host server 46 has only 20 GB hard drive storage space left. When the deployment action of adding these two users is performed, the first user is added successfully because the first user only needs 10 GB of the 20 GB left. However, after the second user is added to the active directory domain server 42 when the second user is added to the virtual desktop infrastructure, a failure is detected at the operation (d) above through the validation procedure because the second user needs 20 GB and the storage host server 46 has only 10 GB left. When this deployment action is determined to be a failure, the virtual desktop servers can't support the requirement of the virtual desktop infrastructure. Therefore, a failure action must be performed to reverse the deployment action of adding two users to the virtual desktop infrastructure. Here the failure action includes: (a) reversing the allocation of 20 GB hard drive storage space for the second user in the storage host server 46, (b) removing the second user from the active directory domain server 42, (c) reversing the allocation of 10 GB hard drive storage space for the first user in the storage host server 46, and (d) removing the first user from the active directory domain server 42. After the failure action, the first and second users are not added to the virtual desktop infrastructure and the hard drive storage space on the storage host server 46 is still 30 GB. The deployment action of adding two users to the virtual desktop infrastructure is reversed as if the above deployment action has never been performed.

At operation 314, the system administrator 10 is prompted to see if a next deployment rule is to be defined. If the system administrator 10 decides to add additional deployment rules, the process proceeds to operation 302 to add additional rules. Otherwise, the process proceeds to operation 316.

At operation 316, the system administrator 10 completes the deployment rules and dependencies configuration. All deployment rules and deployment dependencies are stored at the deployment storage 30-11, and the process of defining deployment rules and dependencies of the virtual desktop deployment entity is completed.

Figure 4:
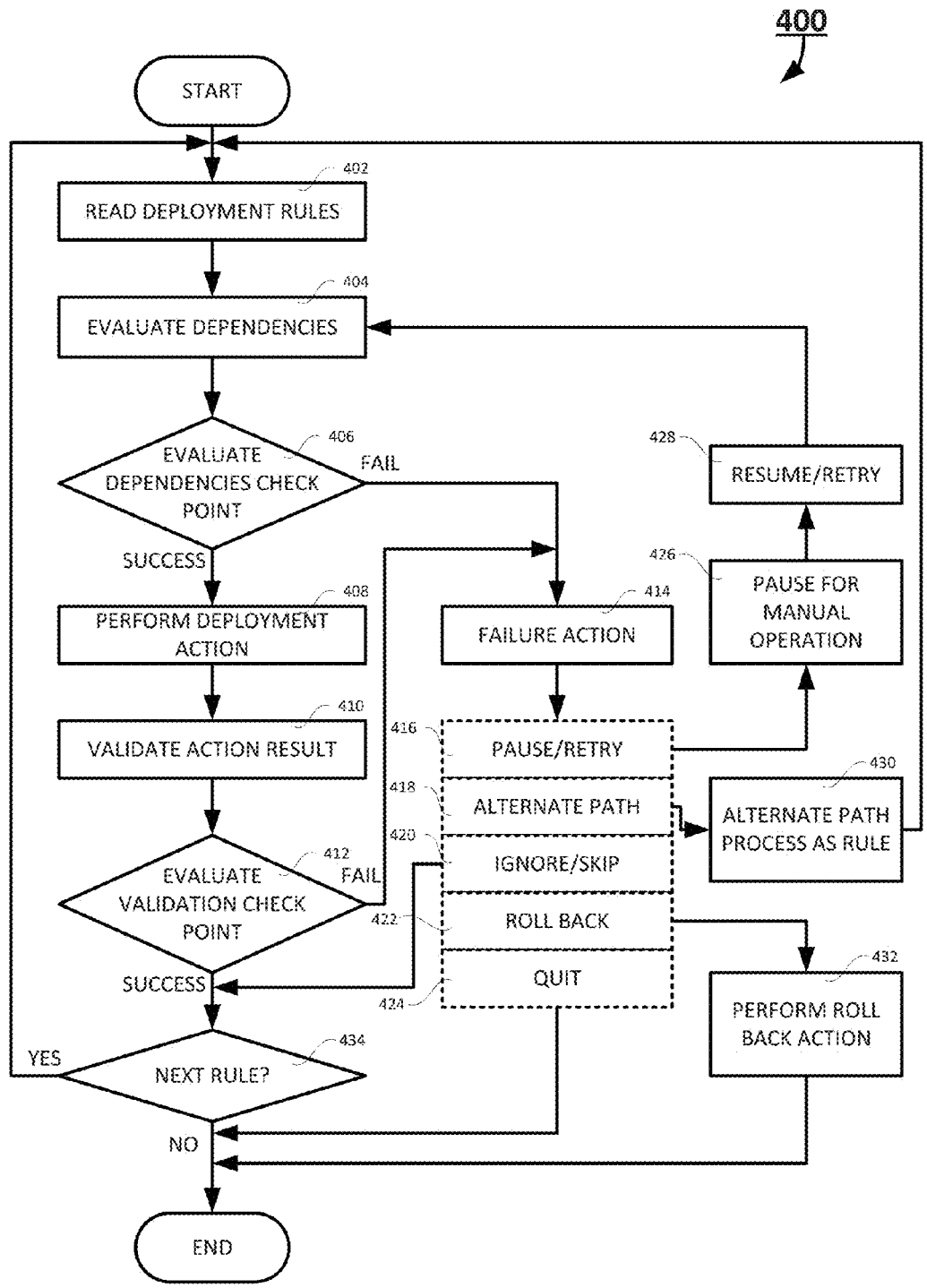
FIG. 4 shows a flow chart of how the virtual desktop infrastructure is deployed and how the virtual desktop deployment entity handles the failures according to certain embodiments of the present disclosure.

Referring now to FIG. 4, a flow chart 400 of a deployment process is shown according to certain embodiments of the present disclosure. At the start operation 402, the virtual desktop deployment entity 30 reads deployment rules from the deployment database 30-11 one rule at a time. The validation check points associated with the deployment rule is also read from the deployment database 30-11.

At operation 404, the virtual desktop deployment entity 30 evaluates the deployment dependencies of the deployment rule. The dependency check points associated with the deployment rule is also read from the deployment database 30-11.

At query operation 406, the virtual desktop deployment entity 30 evaluates the dependency check points to verify if the dependency check points are all successful. If the dependency check points are all successful, the deployment process proceeds to operation 408. Of any one of the dependency check points is a failure, then the deployment process proceeds to operation 414.

At operation 408, the deployment module 30-5 of the virtual desktop deployment entity 30 performs a deployment actions defined for the deployment rule. For example, the deployment action described in the operation 312 as shown in FIG. 3 is to add a first user and a second user to the virtual desktop infrastructure. Following actions are performed to implement the deployment action: (a) adding the first user to the active directory domain server 42, (b) allocating 10 GB hard drive storage space for the first user in the storage host server 46, (c) adding the second user to the active directory domain server 42, (b) allocating 40 GB hard drive storage space for the second user in the storage host server 46.

At operation 410, the deployment module 30-5 of the virtual desktop deployment entity 30 validates results of the deployment action by evaluating the validation check points associated with the deployment rule.

At query operation 412, the validation check points are evaluated. If the validation check points are all successes, the deployment process proceeds to the operation 434. Otherwise, if one or more of the validation check points are failures, then the deployment process proceeds to operation 414.

At query operation 434, the deployment module 30-5 of the virtual desktop deployment entity 30 checks to see if there are more deployment rules to implement. If there are more deployment rules to implement, the deployment process proceeds to increment the rule counter by one and continue to operation 402 for read the next deployment rule. If there are no more deployment rules to implement, the deployment process is completed and the virtual desktop deployment entity 30 ends.

At operation 414, the deployment module 30-5 of the virtual desktop deployment entity 30 handles failure conditions. When at least one dependency check point is a failure at the operation 406, or at least one validation check point is a failure at the operation 412, the deployment module 30-5 of the virtual desktop deployment entity 30 performs one of the failure actions defined and associated with the deployment rule. In certain embodiments, the failure actions include: (a) a pause and retry action 416, (b) an alternate path action 418, (c) an ignore/skip action 420, (d) a roll back action 422, and (e) a quit action 424. The pause and retry action 416 is performed when a failure occurs, and the deployment of the virtual desktop infrastructure is paused such that certain manual operations by the system administrator 10 can be executed to correct the failure. The alternate path action 418 for each validation check point when the validation check point is determined to be a failure, and an alternate path can be defined here and taken to correct the failure. The ignore action 420 is performed if the validation check point is determined to be a failure, and a skip action 420 is performed if the dependency check point is determined to be a failure. The roll back action 422 is performed when the validation check point is determined to be a failure, and the deployment action that caused failures of the validation procedure will be reversed. The quit action 424 is performed when the system administrator 10 determines to end the execution of the virtual desktop deployment entity. When the pause and retry action 416 is performed, following two operations are performed: (a) the virtual desktop deployment is paused (426) for the system administrator 10 to manually correct the failure, and (b) after the system administrator 10 corrects the failure conditions, the deployment process can continue to resume and retry operation (428). When the alternate path action 418 are performed, an alternate path of deployment process is defined, and performed. Such alternate path will not cause the instability of the virtual desktop infrastructure, and therefore, the deployment process can still continue. When the roll back action 422 is performed, the operation 432 is performed and all deployment action that caused instability of the virtual desktop infrastructure will be reversed. The deployment process will end and virtual desktop deployment failed. The quit action 424 is performed when at least one failure of the validation check points or the dependency check points failed but it will not cause instability of the virtual desktop infrastructure, the deployment process will end and virtual desktop deployment failed. When a validation procedure or a verification procedure failed and these failures may not cause instability of the virtual desktop infrastructure, then these failures may be ignored, and this deployment rule can be skip by perform the ignore/skip action 420. The deployment process can continues to implement next deployment rule.

In another aspect, the present disclosure relates to a computer-implemented method for deploying a virtual desktop infrastructure using a virtual desktop deployment system. In certain embodiments, the computer-implemented method includes following operations: (a) receiving configuration and system settings of the virtual desktop infrastructure from a system administrator or a user, (b) discovering the hardware, the software, and the network configuration of one or more virtual desktop servers hosting the virtual desktop infrastructure, and storing the configuration and system settings discovered into a deployment database, (c) scanning the hardware, software, services, roles of the virtual desktop infrastructure and existing network configuration to determine a minimum computer resource required by the virtual desktop infrastructure according to the received configuration and system settings, and storing the minimum computer resource into the deployment database, (d) configuring a set of deployment rules and deployment dependencies of the virtual desktop infrastructure, scheduling deployment jobs, and storing the set of deployment rules and deployment dependencies and the scheduled deployment jobs into the deployment database, (e) initiating a session to establish connection to the virtual desktop servers, (f) reading the virtual desktop infrastructure configuration and system settings from the deployment database, (g) deploying the virtual desktop infrastructure on the virtual desktop servers, and (h) generating status reports of the virtual desktop infrastructure deployment, and storing the status, the reports, and the logs of the virtual desktop infrastructure deployment into the deployment database.

In certain embodiments, the virtual desktop infrastructure includes one or more virtual machines and each of the virtual machines includes one or more virtual desktops for one or more users. The virtual desktop deployment system has: (a) a computer server 30-10, (b) a virtual desktop deployment entity 30, and (c) one or more virtual desktop servers 42, 44, and 46. The computer server 30-10 is configured to deploy the virtual machines by the system administrator, and the computer server 30-10 further includes a deployment database 30-11 for storing virtual desktop infrastructure configuration and system settings.

In certain embodiments, as shown in FIG. 1, the virtual desktop deployment entity includes following modules: (a) a user interface (UI) module 30-1, (b) a deployment status module 30-2, (c) a report module 30-3, (d) a configuration module 30-4, (e) a deployment module 30-5, (f) a session module 30-6, (g) a database abstraction (DBA) module 30-7, (h) a discovery module 30-8, and (i) a pre-requisite module 30-9.

The user interface (UI) module 30-1 allows the system administrator 10 or a user to enter configuration and system settings of the virtual desktop infrastructure, to add a set of deployment rules and dependencies, to create work flow, to schedule one or more deployment jobs, to display the status of deployment of virtual desktop infrastructure, and to display deployment reports. The user interface (UI) module 30-1 performs one or more of following operations: (a) receiving initial configuration and system settings from the system administrator 10, (b) receiving a template for configuring the virtual desktop servers 42, 44, and 46 as default values, (c) importing configuration and system settings of an existing virtual desktop infrastructure, (d) receiving customized configuration and system settings from the system administrator 10, (e) receiving updates of configuration and system settings from the system administrator 10, (f) receiving customized configuration and system settings from the user, (g) receiving updates of the configuration and system settings from the user, (h) exporting configuration and system settings of an existing virtual desktop infrastructure, and (i) storing the received configuration and system settings into the deployment database 30-11. The user interface module 30-1 includes one or more of following interfaces: (a) a window desktop application configured to be accessible from a desktop computer, or a laptop computer, (b) a web user interface (Web UI) configured to be accessible through a communication network, or a cloud, (c) a command line interface (CLI) configured to be accessible from a desktop computer, a laptop computer or a thin client, and (d) a scripts interface configured to be accessible from a desktop computer, a laptop computer or a thin client.

The deployment status module 30-2 monitors the status of the scheduled deployment jobs. The report module 30-3 generates deployment reports on the configuration and system settings of the virtual desktop infrastructure, the status of the scheduled deployment jobs, and the schedules of the scheduled deployment jobs. The report module 30-3 generates following deployment reports: (a) a hardware and software requirement report summarizing the minimum requirements for the virtual desktop infrastructure to be deployed, (b) a pre-requisites scan report for determining if the resource of the hardware and software of existing virtual desktop meets the pre-requisites of the virtual desktop infrastructure to be deployed, (c) a deployment status report showing the current deployment status, and (d) deployment logs showing all activities of the deployment of the virtual desktop infrastructure including all deployment actions performed, all failure actions performed, all validation failures, and all verification failures occurred during the deployment.

The configuration module 30-4 sets up the set of deployment rules and dependencies of the virtual desktop infrastructure, and performs one or more of following operations: (a) defining the set of deployment rules, (b) adding one or more dependencies to each of the set of deployment rules, (c) adding at least one validation check point for each of the set of deployment rules for validation, and at least one dependency check point for each of the set of deployment dependencies for verification, (d) adding at least one deployment action to implement each of the set of deployment rules, (e) adding at least one validation procedure to validate each deployment rule, and at least one verification procedure to verify the dependency check point, after the deployment action is performed, (f) defining at least one failure action for each deployment action when the deployment action is determined to be a failure through the validation procedure, wherein the deployment action is determined to be a failure when the validation check point was not validated successfully, or dependency check point was not verified successfully, (g) defining at least one roll back action to reverse the action when the validation procedure is determined to be a failure, and (h) storing the set of deployment rules and dependencies, the validation check points, the dependency check points, the deployment actions, the validation procedures, the verification procedures, the failure actions, and the roll back actions to the deployment database 30-11.

The session module 30-6 manages the communication between the virtual desktop deployment entity and the virtual desktop servers 42, 44, and 46 using window management instrumentation (WMI) or PowerShell interface. The session module 30-6 initiates at least one session to perform one or more of following operations: (a) establishing communication between the modules of the virtual desktop deployment entity 30 and virtual desktop servers 42, 44, and 46, (b) discovering the hardware of the virtual desktop servers 42, 44, and 46, and existing network configuration using the discovery module, (c) scanning the hardware, software, services, roles of virtual desktop infrastructure and existing network configuration using the pre-requisite module, (d) configuring the set of deployment rules and dependencies of the virtual desktop infrastructure using the configuration module 30-4, (e) deploying the virtual desktop infrastructure using the deployment module, (f) generating reports of the virtual desktop infrastructure deployment by using the report module 30-3, and (g) rolling back of the virtual desktop infrastructure deployment using the deployment module when one or more failures are determined through the validation procedures and verification of the set of the deployment rules and dependencies.

The discovery module 30-9 receives input of information of the virtual desktop servers 42, 44, and 46, and user credentials, and to discover hardware and software of the virtual desktop servers 42, 44, and 46, to perform IP/name based device discovery. The discovery module 30-9 performs one or more of following discovery operations: (a) discovering the hardware of the virtual desktop servers 42, 44, and 46, (b) obtaining the detail resource information of the hardware of the virtual desktop servers 42, 44, and 46, including center processing units (CPUs), the size of the memory installed, the size of storage spaces, and (c) discovering the existing network configuration, including the DHCP server, the IP addresses of each of the virtual desktop servers 42, 44, and 46.

The deployment module 30-5 executes the scheduled deployment jobs to deploy a role/software as a task on the session module 30-6. The database abstraction (DBA) module 30-7 implements database abstraction in a DBA library, and implements data manipulation commands received from the system administrator 10. The pre-requisite module 30-8 scans the hardware, software, services, roles of the virtual desktop infrastructure discovered by the discovery module 30-9 to determine if the hardware, software, services, roles of the current virtual desktop infrastructure meet pre-requisites of the virtual desktop infrastructure to be deployed based on the received configuration and system settings.

In certain embodiments, as shown in FIG. 4, the virtual desktop deployment entity 30 also performs one or more of following operations: (a) validating the validation check point (operation 412) and verifying the dependency check point (operation 406) after each deployment action is performed, (b) retrieving the at least one failure action associated with the deployment action if the results of the validation procedure and the verification procedure determine that the deployment action failed, and (c) performing the at least one failure action (operation 414). The failure actions include: (a) a pause and retry action (416) is taken when the deployment is paused and manual operations are performed by the system administrator 10 to correct the failure, (b) an alternate path action (418) for each validation check point is taken when the validation check point is determined to be a failure, (c) a roll back action (422) is taken when all deployment actions that caused failures of the validation of the validation check point and verification of the dependency check point will be reversed, (d) a quit action (424) is taken when the execution of the virtual desktop deployment operation ends, and (e) an ignore/skip action (420) is taken to move on to the next rule. The ignore action (420) is performed if the validation check point is determined to be a failure. The skip action (420) is performed if the dependency check point is determined to be a failure.

The pre-requisite module 30-8 includes a virtual desktop management console. The virtual desktop management console performs one or more of following operations: (a) obtaining the detail resource information of the software of the virtual desktop servers 42, 44, and 46, including the type of the operation systems, the versions of the operating system installed, and the service packs of the operating system installed, (b) entering hardware requirements of the virtual desktop infrastructure, including the center processing units (CPUs), the size of the memory, the size of storage spaces, and the minimum network requirements, (c) entering software requirements of the virtual desktop infrastructure, including the types of the operation systems, the versions of the operating system, and the service packs of the operating system, (d) entering configuration and system settings, including active directory role, remote desktop service role, hypervisor role, and file sharing role, and (e) storing the configuration and system settings in the deployment database 30-11.

In certain embodiments, the operation of deploying the virtual desktop infrastructure further includes one or more of following operations: (a) providing database abstraction of the virtual desktop infrastructure at the deployment database 30-11, (b) scheduling one or more virtual desktop infrastructure deployment jobs, (c) executing the scheduled virtual desktop infrastructure deployment jobs using the session module 30-6 to deploy the virtual desktop infrastructure, (d) performing background processing and parallel executions for simultaneous deployment jobs, (e) updating the deployment status to the deployment database 30-11, and (f) generating reports of the status of the virtual desktop infrastructure deployment. The deployment job includes one or more of following operations: (a) installing operating system to each of the virtual desktops, (b) enabling operating system roles of each of the virtual desktops, (c) installing software packages according to the configuration and system settings, (d) executing scripts for updating registry settings and firewall configuration, and (e) preparing the virtual desktop manager by configuring web server ports, creating share path, and updating deployment database 30-11.

In yet another aspect, also shown in FIG. 1, the present disclosure relates to non-transitory computer storage medium. The non-transitory computer storage medium stores computer-executable instructions. When executed by a processor of virtual desktop deployment system for deploying a virtual desktop infrastructure, these computer-executable instructions cause the processor to perform one or more of the following operations: (a) receiving configuration and system settings of the virtual desktop infrastructure from a system administrator 10 or a user, (b) discovering the hardware, the software, and the network configuration of a virtual desktop servers 42, 44, and 46 for hosting the virtual desktop infrastructure, and storing the configuration and system settings discovered into a deployment database 30-11, (c) scanning the hardware, software, services, roles of the virtual desktop infrastructure and existing network configuration to determine a minimum computer resource required by the virtual desktop infrastructure according to the received configuration and system settings, and storing the minimum computer resource into the deployment database 30-11, (d) configuring a set of deployment rules and deployment dependencies of the virtual desktop infrastructure, scheduling a set of deployment jobs, and storing the set of deployment rules and deployment dependencies and the scheduled deployment jobs into the deployment database 30-11, (e) initiating a session to establish connection to the virtual desktop servers 42, 44, and 46, (f) reading the virtual desktop infrastructure configuration and system settings from the deployment database 30-11, (g) deploying the virtual desktop infrastructure on the virtual desktop servers 42, 44, and 46, and (h) generating status reports of the virtual desktop infrastructure deployment, and storing the status, the reports, and the logs of the virtual desktop infrastructure deployment into the deployment database 30-11.

In certain embodiments, the virtual desktop deployment system includes: (a) a computer server for deploying virtual desktop infrastructure by the system administrator 10, and the deployment database 30-11 for storing virtual desktop infrastructure configuration and system settings, (b) a virtual desktop deployment entity configured to perform the operation of deploying the virtual desktop infrastructure, and (c) the virtual desktop servers 42, 44, and 46 configured to host the virtual desktop infrastructure. The virtual desktop infrastructure includes one or more virtual machines, and each of the one or more virtual machines includes one or more virtual desktops for one or more users to access.

In certain embodiments, the virtual desktop deployment entity includes following modules: (a) a user interface (UI) module 30-1 for allowing the system administrator 10 or a user to enter configuration and system settings of the virtual desktop infrastructure, to add the set of deployment rules and dependencies, to create work flow, to schedule the deployment jobs, to display the status of deployment of virtual desktop infrastructure, and to display deployment reports, (b) a deployment status module 30-2 for monitoring the status of the scheduled deployment jobs, (c) a report module 30-3 for generating one or more deployment reports on the configuration and system settings of the virtual desktop infrastructure, the schedule and the status of the scheduled deployment jobs, (d) a configuration module 30-4 for setting up the set of deployment rules and dependencies of the virtual desktop infrastructure, (e) a session module 30-6 for managing the communication between the virtual desktop deployment entity and the virtual desktop servers 42, 44, and 46 using window management instrumentation (WMI) or PowerShell interface, (f) a deployment module 30-5 for performing the scheduled deployment jobs to deploy a role/software as a task on the session module 30-6, (g) a database abstraction (DBA) module for implementing database abstraction in a DBA library, and implementing data manipulation commands received from the system administrator 10, (h) a discovery module 30-9 for receiving input of information of the virtual desktop servers 42, 44, and 46, and user credentials, and discovering hardware and software of the virtual desktop servers 42, 44, and 46, to perform IP/name based device discovery, and (i) a pre-requisite module 30-8 for scanning the hardware, software, services, roles of virtual desktop infrastructure discovered by the discovery module 30-9 to determine if the hardware, software, services, roles of current virtual desktop infrastructure meet pre-requisites of the virtual desktop infrastructure to be deployed based on the configuration and system settings received.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A virtual desktop deployment system configured to deploy a virtual desktop infrastructure, comprising:
   a plurality of virtual desktop servers configured to host the virtual desktop infrastructure, wherein the virtual desktop infrastructure comprises a plurality of virtual machines where a plurality of virtual desktops is provided to a plurality of users;
   a computer server configured to deploy the virtual desktop infrastructure by a system administrator, wherein the computer server further comprises a deployment database for storing the virtual desktop infrastructure configuration and system settings; and
   a virtual desktop deployment entity configured to perform following operations:
      receiving configuration and system settings of the virtual desktop infrastructure from the system administrator or a user;
      discovering the hardware, the software, and the network configuration of the plurality of virtual desktop servers, and storing the configuration and system settings discovered into the deployment database;
      scanning the hardware, software, services, roles of the virtual desktop infrastructure and existing network configuration to determine a minimum computer resource required by the virtual desktop infrastructure according to configuration and system settings received by the system administrator or the plurality of users, and storing the minimum computer resource into the deployment database;
      configuring a plurality of deployment rules and deployment dependencies of the virtual desktop infrastructure, scheduling a plurality of deployment jobs, and storing the plurality of deployment rules and deployment dependencies and the scheduled deployment jobs into the deployment database;
      initiating a session to establish connection to the plurality of virtual desktop servers;
      reading the virtual desktop infrastructure configuration and system settings from the deployment database;
      deploying the virtual desktop infrastructure to the plurality of virtual desktop servers; and
      generating status reports of the virtual desktop infrastructure deployment, and storing the status, the reports, and the logs of the virtual desktop infrastructure deployment into the deployment database.

2. The virtual desktop deployment system of claim 1, wherein the virtual desktop deployment entity comprises one or more of following modules:
   a user interface (UI) module configured to allow the system administrator or a user to enter configuration and system settings of the virtual desktop infrastructure, to add a plurality of deployment rules and dependencies, to create work flow, to schedule one or more deployment jobs, to display the status of deployment of virtual desktop infrastructure, and to display deployment reports;
   a deployment status module configured to monitor the status of one or more scheduled deployment jobs;
   a report module configured to generate one or more deployment reports on the configuration and system settings of the virtual desktop infrastructure, the status of the scheduled deployment jobs, and the schedules of the scheduled deployment jobs;

a configuration module configured to set up the plurality of deployment rules and dependencies of the virtual desktop infrastructure;

a session module configured to manage the communication between the virtual desktop deployment entity and the plurality of virtual desktop servers using window management instrumentation (WMI) or PowerShell interface;

a deployment module configured to execute one or more scheduled deployment jobs to deploy a role/software as a task on the session module;

a database abstraction (DBA) module configured to implement database abstraction in a DBA library, and implement data manipulation commands received from the system administrator;

a discovery module configured to receive input of information of the plurality of virtual desktop servers, and user credentials, and to discover hardware and software of the plurality of virtual desktop servers, to perform IP/name based device discovery; and a pre-requisite module configured to scan the hardware, software, services, roles of the virtual desktop infrastructure discovered by the discovery module to determine if the hardware, software, services, roles of the current virtual desktop infrastructure meet pre-requisites of the virtual desktop infrastructure to be deployed based on the received configuration and system settings.

3. The virtual desktop deployment system of claim 2, wherein the user interface (UI) module is configured to perform one or more of following operations:

receiving initial configuration and system settings from the system administrator;

receiving a template for configuring the plurality of virtual desktop servers as default values;

importing configuration and system settings of an existing virtual desktop infrastructure;

receiving customized configuration and system settings from the system administrator;

receiving updates of configuration and system settings from the system administrator;

receiving customized configuration and system settings from the user;

receiving updates of the configuration and system settings from the user;

exporting configuration and system settings of an existing virtual desktop infrastructure; and storing the received configuration and system settings into the deployment database.

4. The virtual desktop deployment system of claim 2, wherein a plurality of deployment rules and dependencies of the virtual desktop infrastructure are configured using the configuration module by performing one or more of following operations:

defining the plurality of deployment rules;

adding one or more dependencies to each of the plurality of deployment rules;

adding at least one validation check point for each of the plurality of deployment rules for validation, and at least one dependency check point for each of the plurality of deployment dependencies for verification;

adding at least one deployment action to implement each of the plurality of deployment rules;

adding at least one validation procedure to validate each deployment rule, and at least one verification procedure to verify the dependency check point, after the deployment action is performed;

defining at least one failure action for each deployment action when the deployment action is determined to be a failure through the validation procedure, wherein the deployment action is determined to be a failure when the validation check point was not validated successfully, or dependency check point was not verified successfully;

defining at least one roll back action to reverse the action when the validation procedure is determined to be a failure; and storing the plurality of deployment rules and dependencies, the validation check points, the dependency check points, the deployment actions, the validation procedures, the verification procedures, the failure actions, and the roll back actions to the deployment database.

5. The virtual desktop deployment system of claim 4, wherein the virtual desktop deployment entity is further configured to perform one or more of following operations:

validating the validation check point and verifying the dependency check point after each deployment action is performed;

retrieving the at least one failure action associated with the deployment action if the results of the validation procedure and the verification procedure determine that the deployment action failed; and performing the at least one failure action.

6. The virtual desktop deployment system of claim 5, wherein the failure action comprises:

a pause and retry action wherein the deployment of the virtual desktop infrastructure is paused and manual operations can be executed to correct the failure;

an alternate path action for each validation check point when the validation check point is determined to be a failure;

an ignore/skip action to move on to the next rule, wherein an ignore action is performed if the validation check point is determined to be a failure, and a skip action is performed if the dependency check point is determined to be a failure;

a roll back action where all deployment actions that caused failures of the validation of the validation check point and verification of the dependency check point will be reversed; and a quit action to end the execution of the virtual desktop deployment entity.

7. The virtual desktop deployment system of claim 6, wherein at least one session is initiated by the session module to perform one or more of following operations:

establishing communication between the modules of the virtual desktop deployment entity and plurality of virtual desktop servers;

discovering the hardware of the plurality of virtual desktop servers, and existing network configuration using the discovery module;

scanning the hardware, software, services, roles of virtual desktop infrastructure and existing network configuration using the pre-requisite module;

configuring the plurality of deployment rules and dependencies of the virtual desktop infrastructure using the configuration module;

deploying the virtual desktop infrastructure using the deployment module;

generating reports of the virtual desktop infrastructure deployment by using the report module; and rolling back of the virtual desktop infrastructure deployment using the deployment module when one or more failures are determined through the validation procedures and verification of the plurality of the deployment rules and dependencies.

8. The virtual desktop deployment system of claim 7, wherein the discovery module is configured to perform one or more of following operations:
discovering the hardware of the plurality of virtual desktop servers;
obtaining the detail resource information of the hardware of the plurality of virtual desktop servers, including center processing units (CPUs), the size of the memory installed, the size of storage spaces, and
discovering the existing network configuration, including the DHCP server, the IP addresses of each of the plurality of virtual desktop servers.

9. The virtual desktop deployment system of claim 8, wherein the pre-requisite module comprises a virtual desktop management console configured to perform one or more of following operations:
obtaining the detail resource information of the software of the plurality of virtual desktop servers, including the type of the operation systems, the versions of the operating system installed, and the service packs of the operating system installed;
entering hardware requirements of the virtual desktop infrastructure, including the center processing units (CPUs), the size of the memory, the size of storage spaces, and the minimum network requirements;
entering software requirements of the virtual desktop infrastructure, including the types of the operation systems, the versions of the operating system, and the service packs of the operating system;
entering configuration and system settings, including active directory role, remote desktop service role, hypervisor role, and file sharing role; and
storing the configuration and system settings in the deployment database.

10. The virtual desktop deployment system of claim 2, wherein the operation of deploying the virtual desktop infrastructure further comprises one or more of following operations:
providing database abstraction of the virtual desktop infrastructure at the deployment database;
scheduling one or more virtual desktop infrastructure deployment jobs;
executing the scheduled virtual desktop infrastructure deployment jobs using the session module to deploy the virtual desktop infrastructure;
performing background processing and parallel executions for simultaneous deployment jobs;
updating the deployment status to the deployment database; and
generating reports of the status of the virtual desktop infrastructure deployment.

11. The virtual desktop deployment system of claim 10, wherein the virtual desktop deployment system further comprises a virtual desktop manager having:
a window remote management software configured to implement web services for management protocol;
a windows management instrumentation configured to implement web-based enterprise management and common information model standard;
a redistributable window operating system;
a RAM disk driver;
a data share path; and
an operating system de-duplication system.

12. The virtual desktop deployment system of claim 11, wherein the deployment job comprises one or more of following operations:
installing operating system to each of the plurality of virtual desktops;
enabling operating system roles of each of the plurality of virtual desktops;
installing software packages according to the configuration and system settings;
executing scripts for updating registry settings and firewall configuration; and
preparing the virtual desktop manager by configuring web server ports, creating share path, and updating deployment database.

13. The virtual desktop deployment system of claim 2, wherein the user interface module comprises one or more of following interfaces:
a window desktop application configured to be accessible from a desktop computer, or a laptop computer;
a web user interface (Web UI) configured to be accessible through a communication network, or a cloud;
a command line interface (CLI) configured to be accessible from a desktop computer, a laptop computer or a thin client; and
a scripts interface configured to be accessible from a desktop computer, a laptop computer or a thin client.

14. The virtual desktop deployment system of claim 2, wherein the deployment database comprises one of: a SQLite database, a PostgreSQL database, and an SQL server.

15. The virtual desktop deployment system of claim 2, wherein the deployment reports generated by the report module comprise:
a hardware and software requirement report summarizing the minimum requirements for the virtual desktop infrastructure to be deployed;
a pre-requisites scan report configured to determine if the resource of the hardware and software of existing virtual desktop meets the pre-requisites of the virtual desktop infrastructure to be deployed;
a deployment status report showing the current deployment status; and
deployment logs showing all activities of the deployment of the virtual desktop infrastructure including all deployment actions performed, all failure actions performed, all validation failures, and all verification failures occurred during the deployment.

16. A computer-implemented method for deploying a virtual desktop infrastructure using a virtual desktop deployment system, comprising:
receiving configuration and system settings of the virtual desktop infrastructure from a system administrator or a user;
discovering the hardware, the software, and the network configuration of a plurality of virtual desktop servers where the virtual desktop infrastructure is hosted, and storing the configuration and system settings discovered into a deployment database;
scanning the hardware, software, services, roles of the virtual desktop infrastructure and existing network configuration to determine a minimum computer resource required by the virtual desktop infrastructure according to the received configuration and system settings, and storing the minimum computer resource into the deployment database;
configuring a plurality of deployment rules and deployment dependencies of the virtual desktop infrastructure, scheduling a plurality of deployment jobs, and storing the plurality of deployment rules and deployment dependencies and the scheduled deployment jobs into the deployment database;

initiating a session to establish connection to the plurality of virtual desktop servers;

reading the virtual desktop infrastructure configuration and system settings from the deployment database;

deploying the virtual desktop infrastructure on the plurality of virtual desktop servers; and generating status reports of the virtual desktop infrastructure deployment, and storing the status, the reports, and the logs of the virtual desktop infrastructure deployment into the deployment database.

17. The computer-implemented method of claim 16, wherein the virtual desktop deployment system comprises:
    a computer server configured to deploy the virtual desktop infrastructure by the system administrator, wherein the computer server further comprises a deployment database for storing virtual desktop infrastructure configuration and system settings;
    a virtual desktop deployment entity configured to perform the operation of deploying the virtual desktop infrastructure; and
    the plurality of virtual desktop servers.

18. The computer-implemented method of claim 17, wherein the virtual desktop infrastructure comprises a plurality of virtual machines where a plurality of virtual desktops is provided to a plurality of users.

19. The computer-implemented method of claim 18, wherein the virtual desktop deployment entity comprises:
    a user interface (UI) module configured to allow the system administrator or a user to enter configuration and system settings of the virtual desktop infrastructure, to add the plurality of deployment rules and dependencies, to create work flow, to schedule the plurality of deployment jobs, to display the status of deployment of virtual desktop infrastructure, and to display deployment reports;
    a deployment status module configured to monitor the status of the plurality of scheduled deployment jobs;
    a report module configured to generate one or more deployment reports on the configuration and system settings of the virtual desktop infrastructure, the schedule and the status of the plurality of scheduled deployment jobs;
    a configuration module configured to set up the plurality of deployment rules and dependencies of the virtual desktop infrastructure;
    a session module configured to manage the communication between the virtual desktop deployment entity and the plurality of virtual desktop servers using window management instrumentation (WMI) or PowerShell interface;
    a deployment module configured to execute one or more scheduled deployment jobs to deploy a role/software as a task on the session module;
    a database abstraction (DBA) module configured to implement database abstraction in a DBA library, and implement data manipulation commands received from the system administrator;
    a discovery module configured to receive input of information of the plurality of virtual desktop servers, and user credentials, and to discover hardware and software of the plurality of virtual desktop servers, to perform IP/name based device discovery; and
    a pre-requisite module configured to scan the hardware, software, services, roles of virtual desktop infrastructure discovered by the discovery module to determine if the hardware, software, services, roles of current virtual desktop infrastructure meet pre-requisites of the virtual desktop infrastructure to be deployed based on the configuration and system settings received.

20. The computer-implemented method of claim 19, wherein the user interface (UI) module is configured to perform one or more of following operations:
    receiving initial configuration and system settings from the system administrator;
    receiving a template for configuring the plurality of virtual desktop servers as default values;
    importing configuration and system settings of an existing virtual desktop infrastructure;
    receiving customized configuration and system settings from the system administrator;
    receiving updates of configuration and system settings from the system administrator;
    receiving customized configuration and system settings from the plurality of users;
    receiving updates of the configuration and system settings from and the plurality of users;
    exporting configuration and system settings of an existing virtual desktop infrastructure; and
    storing the received configuration and system settings into the deployment database.

21. The computer-implemented method of claim 19, wherein a plurality of deployment rules and dependencies of the virtual desktop infrastructure are configured using the configuration module by performing one or more of following operations:
    defining the plurality of deployment rules;
    adding one or more dependencies to each of the plurality of deployment rules;
    adding at least one validation check point for each of the plurality of deployment rules for validation, and at least one dependency check point for each of the plurality of deployment dependencies for verification;
    adding at least one deployment action to implement each of the plurality of deployment rules;
    adding at least one validation procedure to validate each deployment rule, and at least one verification procedure to verify the dependency check point, after the deployment action is performed;
    defining at least one failure action for each deployment action when the deployment action is determined to be a failure through the validation procedure, wherein the deployment action is determined to be a failure when the validation check point was not validated successfully, or dependency check point was not verified successfully;
    defining at least one roll back action to reverse the action when the validation procedure is determined to be a failure; and
    storing the plurality of deployment rules and dependencies, the validation check points, the dependency check points, the deployment actions, the validation procedures, the verification procedures, the failure actions, and the roll back actions to the deployment database.

22. The computer-implemented method of claim 21, wherein the virtual desktop deployment entity is further configured to perform one or more of following operations:
    validating the validation check point and verifying the dependency check point after each deployment action is performed;
    retrieving the at least one failure action associated with the deployment action if the results of the validation procedure and the verification procedure determine that the deployment action failed; and performing the at least one failure action, wherein the failure action comprises:
  a pause and retry action wherein the deployment of the virtual desktop infrastructure is paused and manual operations can be executed to correct the failure;
  an alternate path action for each validation check point when the validation check point is determined to be a failure;
  an ignore/skip action to move on to the next rule, wherein an ignore action is performed if the validation check point is determined to be a failure, and a skip action is performed if the dependency check point is determined to be a failure;
  a roll back action where all deployment actions that caused failures of the validation of the validation check point and verification of the dependency check point will be reversed; and
  a quit action to end the execution of the virtual desktop deployment entity.

23. The computer-implemented method of claim 19, wherein at least one session is initiated by the session module to perform one or more of following operations:
  establishing communication between the modules of the virtual desktop deployment entity and plurality of virtual desktop servers;
  discovering the hardware of the plurality of virtual desktop servers, and existing network configuration using the discovery module;
  scanning the hardware, software, services, roles of virtual desktop infrastructure and existing network configuration using the pre-requisite module;
  configuring the plurality of deployment rules and dependencies of the virtual desktop infrastructure using the configuration module;
  deploying the virtual desktop infrastructure using the deployment module;
  generating reports of the virtual desktop infrastructure deployment by using the report module; and
  rolling back of the virtual desktop infrastructure deployment using the deployment module when one or more failures are determined through the validation procedures and verification of the plurality of the deployment rules and dependencies.

24. The computer-implemented method of claim 19, wherein the discovery module is configured to perform one or more of following operations:
  discovering the hardware of the plurality of virtual desktop servers;
  obtaining the detail resource information of the hardware of the plurality of virtual desktop servers, including center processing units (CPUs), the size of the memory installed, the size of storage spaces, and
  discovering the existing network configuration, including the DHCP server, the IP addresses of each of the plurality of virtual desktop servers.

25. The computer-implemented method of claim 19, wherein the pre-requisite module comprises a virtual desktop management console configured to perform one or more of following operations:
  obtaining the detail resource information of the software of the plurality of virtual desktop servers, including the type of the operation systems, the versions of the operating system installed, and the service packs of the operating system installed;
  entering hardware requirements of the virtual desktop infrastructure, including the center processing units (CPUs), the size of the memory, the size of storage spaces, and the minimum network requirements;
  entering software requirements of the virtual desktop infrastructure, including the types of the operation systems, the versions of the operating system, and the service packs of the operating system;
  entering configuration and system settings, including active directory role, remote desktop service role, hypervisor role, and file sharing role; and
  storing the configuration and system settings in the deployment database.

26. The computer-implemented method of claim 19, wherein the operation of deploying the virtual desktop infrastructure further comprises one or more of following operations:
  providing database abstraction of the virtual desktop infrastructure at the deployment database;
  scheduling one or more virtual desktop infrastructure deployment jobs;
  executing the scheduled virtual desktop infrastructure deployment jobs using the session module to deploy the virtual desktop infrastructure;
  performing background processing and parallel executions for simultaneous deployment jobs;
  updating the deployment status to the deployment database; and
  generating reports of the status of the virtual desktop infrastructure deployment.

27. The computer-implemented method of claim 19, wherein the deployment job comprises one or more of following operations:
  installing operating system to each of the plurality of virtual desktops;
  enabling operating system roles of each of the plurality of virtual desktops;
  installing software packages according to the configuration and system settings;
  executing scripts for updating registry settings and firewall configuration; and
  preparing the virtual desktop manager by configuring web server ports, creating share path, and updating deployment database.

28. A non-transitory computer storage medium having computer-executable instructions stored thereon which, when executed by a processor of virtual desktop deployment system for deploying a virtual desktop infrastructure, cause the processor to perform the following operations:
  receiving configuration and system settings of the virtual desktop infrastructure from a system administrator or a user;
  discovering the hardware, the software, and the network configuration of a plurality of virtual desktop servers for hosting the virtual desktop infrastructure, and storing the configuration and system settings discovered into a deployment database;
  scanning the hardware, software, services, roles of the virtual desktop infrastructure and existing network configuration to determine a minimum computer resource required by the virtual desktop infrastructure according to the received configuration and system settings, and storing the minimum computer resource into the deployment database;
  configuring a plurality of deployment rules and deployment dependencies of the virtual desktop infrastructure, scheduling a plurality of deployment jobs, and storing the plurality of deployment rules and deployment dependencies and the scheduled deployment jobs into the deployment database;

initiating a session to establish connection to the plurality of virtual desktop servers;

reading the virtual desktop infrastructure configuration and system settings from the deployment database;

deploying the virtual desktop infrastructure on the plurality of virtual desktop servers; and generating status reports of the virtual desktop infrastructure deployment, and storing the status, the reports, and the logs of the virtual desktop infrastructure deployment into the deployment database.

29. The non-transitory computer storage medium of claim 28, wherein the virtual desktop deployment system comprises:

a computer server configured to deploy the virtual desktop infrastructure by the system administrator, wherein the computer server further comprises the deployment database for storing virtual desktop infrastructure configuration and system settings;

a virtual desktop deployment entity configured to perform the operation of deploying the virtual desktop infrastructure; and the plurality of virtual desktop servers configured to host the virtual desktop infrastructure, wherein the virtual desktop infrastructure comprises the plurality of virtual machines where a plurality of virtual desktops is provided to a plurality of users.

30. The non-transitory computer storage medium of claim 29, wherein the virtual desktop deployment entity comprises:

a user interface (UI) module configured to allow the system administrator or a user to enter configuration and system settings of the virtual desktop infrastructure, to add the plurality of deployment rules and dependencies, to create work flow, to schedule the plurality of deployment jobs, to display the status of deployment of virtual desktop infrastructure, and to display deployment reports;

a deployment status module configured to monitor the status of the plurality of scheduled deployment jobs;

a report module configured to generate one or more deployment reports on the configuration and system settings of the virtual desktop infrastructure, the schedule and the status of the plurality of scheduled deployment jobs;

a configuration module configured to set up the plurality of deployment rules and dependencies of the virtual desktop infrastructure;

a session module configured to manage the communication between the virtual desktop deployment entity and the plurality of virtual desktop servers using window management instrumentation (WMI) or PowerShell interface;

a deployment module configured to execute one or more scheduled deployment jobs to deploy a role/software as a task on the session module;

a database abstraction (DBA) module configured to implement database abstraction in a DBA library, and implement data manipulation commands received from the system administrator;

a discovery module configured to receive input of information of the plurality of virtual desktop servers, and user credentials, and to discover hardware and software of the plurality of virtual desktop servers, to perform IP/name based device discovery; and a pre-requisite module configured to scan the hardware, software, services, roles of virtual desktop infrastructure discovered by the discovery module to determine if the hardware, software, services, roles of current virtual desktop infrastructure meet pre-requisites of the virtual desktop infrastructure to be deployed based on the configuration and system settings received.

* * * * *